(12) United States Patent
Yeo et al.

(10) Patent No.: US 12,058,697 B2
(45) Date of Patent: *Aug. 6, 2024

(54) METHOD AND DEVICE FOR DETERMINING TRANSMISSION TIME IN WIRELESS COMMUNICATION SYSTEM

(71) Applicant: Samsung Electronics Co., Ltd., Suwon-si (KR)

(72) Inventors: Jeongho Yeo, Suwon-si (KR); Sungjin Park, Suwon-si (KR); Taehyoung Kim, Suwon-si (KR); Jonghyun Bang, Suwon-si (KR); Jinyoung Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/980,119

(22) Filed: Nov. 3, 2022

(65) Prior Publication Data

US 2023/0063957 A1    Mar. 2, 2023

Related U.S. Application Data

(63) Continuation of application No. 17/053,965, filed as application No. PCT/KR2019/005647 on May 10, 2019, now Pat. No. 11,528,741.

(30) Foreign Application Priority Data

| May 11, 2018 | (KR) | ......................... 10-2018-0054577 |
| May 22, 2018 | (KR) | ......................... 10-2018-0058038 |
| May 23, 2018 | (KR) | ......................... 10-2018-0058646 |

(51) Int. Cl.
*H04W 72/14*  (2009.01)
*H04W 72/12*  (2023.01)
(Continued)

(52) U.S. Cl.
CPC ....... *H04W 72/23* (2023.01); *H04W 72/1268* (2013.01)

(58) Field of Classification Search
CPC ..... H04L 1/0041; H04L 1/0045; H04L 5/001; H04L 5/0051; H04L 5/0055; H04L 1/00;
(Continued)

(56) References Cited

U.S. PATENT DOCUMENTS

| 8,737,253 B2 | 5/2014 | Ko et al. |
| 9,749,117 B2 | 8/2017 | Ko et al. |

(Continued)

FOREIGN PATENT DOCUMENTS

| CN | 103733549 A | 4/2014 |
| CN | 105900369 A | 8/2016 |

(Continued)

OTHER PUBLICATIONS

Samsung, Basic procedure for BWP switching, R2-1802436, 3GPP TSG RAN WG2 Meeting #101, Athens, Greece, Feb. 14, 2018.

(Continued)

*Primary Examiner* — Nathan S Taylor
(74) *Attorney, Agent, or Firm* — Jefferson IP Law, LLP

(57) ABSTRACT

A method, performed by a terminal, of transmitting or receiving a signal in a wireless communication system includes receiving control information including an uplink grant from a base station, determining whether there is a bandwidth part switching command based on the control information, and determining, based on the uplink grant, whether to transmit a physical uplink shared channel to the base station, based on whether there is the bandwidth part switching command.

10 Claims, 16 Drawing Sheets

(51) Int. Cl.
*H04W 72/1268* (2023.01)
*H04W 72/23* (2023.01)

(58) Field of Classification Search
CPC .............. H04L 5/00; H04W 72/0453; H04W 72/1268; H04W 72/1289; H04W 72/14; H04W 72/1263; H04W 72/1278; H04W 72/12; H04W 72/04
See application file for complete search history.

(56) References Cited

U.S. PATENT DOCUMENTS

| | | | |
|---|---|---|---|
| 10,205,576 | B2 | 2/2019 | Ahn et al. |
| 11,064,434 | B2* | 7/2021 | Lin ................... H04W 52/0206 |
| 11,277,294 | B2 | 3/2022 | Yi et al. |
| 11,394,501 | B2 | 7/2022 | Yeo et al. |
| 2015/0264689 | A1 | 9/2015 | Sampath et al. |
| 2018/0049203 | A1 | 2/2018 | Xue et al. |
| 2018/0049234 | A1 | 2/2018 | Lee et al. |
| 2018/0115981 | A1 | 4/2018 | Kim et al. |
| 2019/0037586 | A1* | 1/2019 | Park ........................ H04L 5/00 |
| 2019/0103954 | A1 | 4/2019 | Lee et al. |
| 2019/0132857 | A1 | 5/2019 | Babaei et al. |
| 2019/0141546 | A1 | 5/2019 | Zhou et al. |
| 2019/0141742 | A1 | 5/2019 | Zhou et al. |
| 2019/0149305 | A1 | 5/2019 | Zhou et al. |
| 2019/0182870 | A1 | 6/2019 | Shih et al. |
| 2019/0215896 | A1 | 7/2019 | Zhou et al. |
| 2019/0215897 | A1 | 7/2019 | Babaei et al. |
| 2019/0261425 | A1 | 8/2019 | Park et al. |
| 2019/0289513 | A1 | 9/2019 | Jeon et al. |
| 2019/0349983 | A1 | 11/2019 | Loehr et al. |
| 2019/0364602 | A1 | 11/2019 | Yi et al. |
| 2020/0120584 | A1 | 4/2020 | Yi et al. |
| 2020/0120650 | A1 | 4/2020 | Yi et al. |
| 2020/0136878 | A1 | 4/2020 | Yi et al. |
| 2021/0176757 | A1 | 6/2021 | Hwang et al. |
| 2021/0227477 | A1 | 7/2021 | Lee et al. |
| 2021/0235492 | A1 | 7/2021 | Iyer et al. |
| 2021/0243793 | A1 | 8/2021 | Ang et al. |
| 2022/0166562 | A1 | 5/2022 | Lee et al. |

FOREIGN PATENT DOCUMENTS

| | | |
|---|---|---|
| GB | 201718966 | 5/2019 |
| GB | 201719102 | 5/2019 |
| KR | 10-2011-0069741 A | 6/2011 |
| KR | 10-2018-0035657 A | 4/2018 |
| RU | 2595642 C1 | 8/2016 |
| WO | 2018/038418 A1 | 3/2018 |
| WO | 2011/130393 A1 | 10/2021 |

OTHER PUBLICATIONS

Mediatek Inc., Remaining Details on Bandwidth Part Operation in NR, R1-1801638, 3GPP TSG RAN WG1 Meeting #92, Athens, Greece, Feb. 17, 2018.
Huawei et al., Details on BWP Switching Operation, R4-1802834, 3GPP TSG-RAN WG4 Meeting #86, Athens, Greece, Feb. 19, 2018.
LG Electronics Inc., UE autonomous BWP switching for configured UL, R2-1802438, 3GPP TSG RAN WG2 Meeting #101, Athens, Greece, Feb. 15, 2018.
International Search Report dated Aug. 22, 2019, issued in International Application No. PCT/KR2019/005647.
Mediatek Inc., Remaining details on UL/DL Resource Allocation, R1-1801681, 3GPP TSG RAN WG1 Meeting R1-92, Feb. 17, 2018, Athens, Greece, XP051397681.
ITRI, Discussion on bandwidth part operation, R1-1803966, 3GPP TSG-RAN WG1 Meeting #92bis, Apr. 15, 2018, Sanya, China, XP051426255.
3rd Generation Partnership Project; Technical Specification Group Radio Access Network; NR; Physical layer procedures for data (Release 15), 3GPP TS 38.214 V15.1.0, Apr. 9, 2018, XP051451093.
European Search Report dated May 26, 2021, issued in European Application No. 19800576.1.
Indian Office Action dated Sep. 21, 2022, issued in Indian Application No. 202037053553.
Notice of Allowance dated Jul. 4, 2022, issued in Russian Application No. 2020140773.
Samsung; Corrections on Bandwidth Part Operation; 3GPP TSG RAN WG1 Meeting #92bis; R1-1804380; Apr. 16-20, 2018; Sanya, China.
Mediatek Inc.; Remaining Details on Bandwidth Part Operation in NR; 3GPP TSG RAN WG1 Meeting AH 1801; R1-1800148; Jan. 22-26, 2018; Vancouver, Canada.
Chinese Office Action with English translation dated Sep. 6, 2023; Chinese Appln. No. 201980031780.7.
European Search Report dated Dec. 22, 2022, issued in European Application No. 19 800 576.1.
Qualcomm Incorporated; Remaining Issues on BWP; 3GPP TSG RAN WG1 Meeting #92bis; R1-1804809; Sanya, China; Apr. 16-20, 2018.
Korean Office Action with English translation dated Mar. 5, 2024; Korean Appln. No. 10-2018-0058646.
Chinese Office Action with English translation dated Feb. 8, 2024; Chinese Appln. No. 201980031780.7.

* cited by examiner

METHOD AND DEVICE FOR DETERMINING TRANSMISSION TIME IN WIRELESS COMMUNICATION SYSTEM

CROSS-REFERENCE TO RELATED APPLICATION(S)

This application is a continuation application of prior Application Ser. No. 17/053,965 filed on Nov. 9, 2020, which is a U.S. National Stage application under 35 U.S.C. § 371 of an International application number PCT/KR2019/005647 filed on May 10, 2019, which is based on and claims priority of a Korean patent application number 10-2018-0054577, filed on May 11, 2018, in the Korean Intellectual Property Office, and of a Korean patent application number 10-2018-0058038, filed on May 22, 2018, in the Korean Intellectual Property Office, and of a Korean patent application number, 10-2018-0058646, filed on May 23, 2018, in the Korean Intellectual Property Office, the disclosure of each of which is incorporated by reference herein in its entirety.

TECHNICAL FIELD

The disclosure relates to a wireless communication system, and to a method and apparatus for determining a time for transmission. More particularly, the disclosure relates to a method of determining a time for transmission when a terminal performs uplink transmission related to a signal transmitted from a base station.

BACKGROUND ART

To meet demand due to ever-increasing wireless data traffic since the commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. The 5G communication system defined by the 3rd Generation Partnership Project (3GPP) is called a new radio (NR) system. Implementation of the 5G communication system using ultra-frequency (mmWave) bands, e.g., 60 GHz bands, is considered to achieve higher data rates. To reduce propagation loss of radio waves and increase a transmission range of radio waves in the ultra-frequency bands, beamforming, massive multiple-input multiple-output (massive MIMO), full dimensional MIMO (FD-MIMO), array antenna, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, machine to machine (M2M) communication, machine type communication (MTC) for connection between things are being studied. Such an IoT environment may provide intelligent Internet technology (IT) services that create new value to human life by collecting and analyzing data generated among connected things. IoT may be applied to a variety of areas, such as smart homes, smart buildings, smart cities, smart cars or connected cars, a smart grid, health care, smart home appliances and advanced medical services through convergence and combination between existing information technologies (IT) and various industrial applications.

In this regard, various attempts to apply the 5G communication system to the IoT network are being made. For example, 5G communication such as a sensor network, M2M communication, MTC, etc., is implemented by such techniques as beamforming, MIMO, array antenna, etc. Even application of a cloud radio access network (cloud RAN) as the aforementioned big data processing technology may be an example of convergence of 5G and IoT technologies.

With the development of the aforementioned technologies and mobile communication systems, it is possible to provide various services, and there is a need for a method to provide the services effectively.

DESCRIPTION OF EMBODIMENTS

Technical Problem

Embodiments of the disclosure provide an apparatus and method capable of effectively providing a service in a mobile communication system.

Technical Solution to Problem

According to an embodiment, a method, performed by a terminal, of transmitting or receiving a signal in a wireless communication system may include receiving control information including an uplink grant from a base station, determining whether switching of a bandwidth part is required based on the control information, and determining, based on the uplink grant, whether to transmit a physical uplink shared channel to the base station, based on whether switching of a bandwidth part is required.

Advantageous Effects of Disclosure

A method, performed by a terminal, of transmitting or receiving a signal in a wireless communication system may calculate a minimum processing time based on whether switching of a bandwidth part is required to efficiently transmit or receive a signal.

BEST MODE

Figure 1:
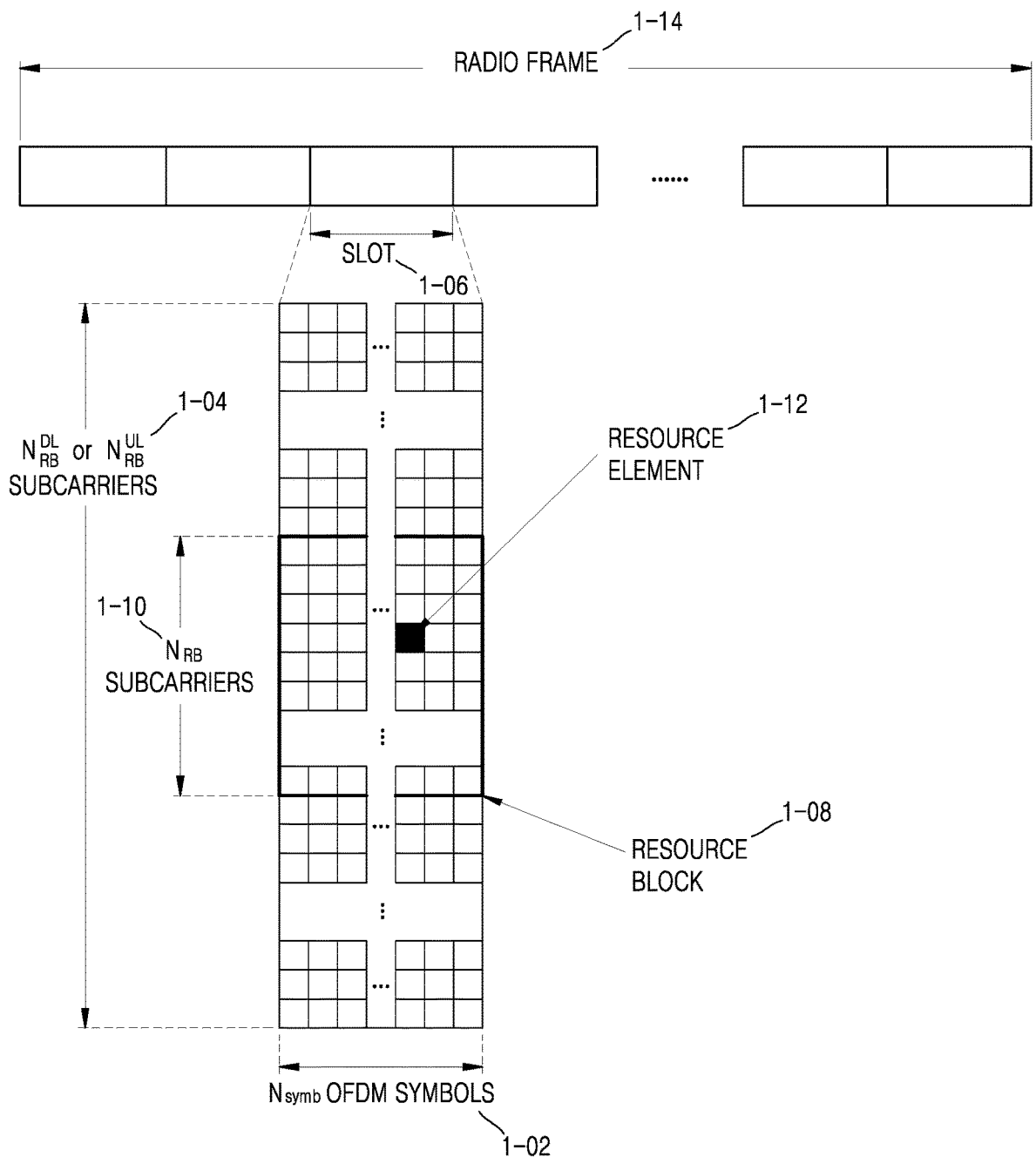
FIG. 1 shows a transport structure of the time-frequency resource region, which is a radio resource region of a 5th generation (5G) or NR system.

A method, performed by a terminal, of transmitting or receiving a signal in a wireless communication system may include receiving control information including an uplink grant from a base station, determining whether switching of a bandwidth part is required based on the control information, and determining, based on the uplink grant, whether to transmit a physical uplink shared channel to the base station, based on whether switching of bandwidth part is required.

MODE OF DISCLOSURE

Embodiments of the disclosure will be described in detail with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternate embodiments of the disclosure. For example, two successive blocks may be performed substantially at the same time or in reverse order.

Furthermore, the term 'unit' or 'module' as herein used refers to a software or hardware component, such as field programmable gate array (FPGA) or application specific integrated circuit (ASIC) which plays some role. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e communication standards. Furthermore, for the $5^{th}$ generation (5G) wireless communication system, communication standards for 5G or new radio (NR) are being made.

As a representative example of a wide band wireless communication system, the 5G or NR system employs orthogonal frequency division multiplexing schemes for downlink (DL) and uplink (UL). Specifically, a cyclic prefix OFDM (CP-OFDM) scheme is employed for DL, and together with the CP-OFDM, discrete Fourier transform spreading OFDM (DFT-S-OFDM) scheme is employed for UL. The UL refers to a radio link for a terminal (or user equipment (UE) or mobile station (MS)) to transmit data or a control signal to a base station (BS, or gNode B), and the DL refers to a radio link for a BS to transmit data or a control signal to a terminal. The multiple access scheme allocates and operates time-frequency resources for carrying data or control information for respective users not to overlap each other, i.e., to maintain orthogonality, thereby differentiating each user's data or control information.

The 5G or NR system adopts a Hybrid Automatic Repeat request (HARQ) scheme that re-transmits corresponding data through a physical layer in a case that decoding fails at the initial stage of transmission. By the HARQ scheme, if a receiver fails to correctly decode data, the receiver transmits information indicating the decoding failure (NACK; Negative Acknowledgment) to a transmitter so that the transmitter may re-transmit the corresponding data through the physical layer. The receiver increases data reception capability by combining the data re-transmitted by the transmitter with the data for which decoding has failed. Further, in a case that the receiver correctly decodes data, the receiver may transmit information indicating decoding success (ACK; Acknowledgment) to the transmitter so that the transmitter may transmit new data.

In the meantime, a new radio access technology (NR) system for new 5G communication is designed to freely multiplex various services in time and frequency resources, so that a waveform/numerology or the like, and a reference signal or the like, may be dynamically or freely allocated as required for the corresponding service. For wireless communication to provide a best service to a terminal, it is important to optimize data transmission through measurement of quality and interference of a channel, and accordingly, channel state measurement is essential. However, unlike the $4^{th}$ generation (4G) communication where channel and interference properties are not significantly changed depending on frequency resources, a 5G or NR channel has channel and interference properties that significantly change depending on services and is thus required to support a frequency resource group (FRG)-wise subset, which enables division of the measurement. In the meantime, service types supported in the 5G or NR system may be divided into categories, such as enhanced mobile broadband (eMBB), massive machine type communications (mMTC), ultra-reliable and low-latency communications (URLLC), etc. The eMBB is a service for high rate transmission of high volume data, the mMTC is a service for least power consumption at the terminal and accesses of multiple terminals, and the URLLC is a service for high reliability and low latency. Depending on the type of service applied to the terminal, different requirements may be applied.

In the disclosure, the first signal may be a UL scheduling grant signal and a DL data signal. Furthermore, in the disclosure, the second signal may be a UL data signal for UL scheduling grant and an HARQ ACK/NACK for a DL data signal. Specifically, in the disclosure, of signals transmitted by the BS to the UE, a signal expecting a response from the UE may be the first signal, and a signal from the UE in response to the first signal may be the second signal.

Furthermore, in the disclosure, a service type of the first signal may belong to a category of enhanced mobile broadband (eMBB), massive machine type communications (mMTC), and ultra-reliable and low-latency communications (URLLC). It is, however, an example, and the service type of the first signal in the disclosure is not limited to the category.

In the disclosure, a TTI length of the first signal may refer to length of a period of time in which the first signal is transmitted. Furthermore, in the disclosure, a TTI length of the second signal may refer to length of a period of time in which the second signal is transmitted. In the disclosure, second signal transmission timing is information about when a UE transmits the second signal and when a BS receives the second signal, and may be interchangeably used with second signal transmission/reception timing. Terms used in the disclosure are defined by taking the respective functionalities into account, but may vary depending on certain practices or intentions of users or operators. Accordingly, the terms should be defined based on the descriptions throughout this specification. In the following description, a BS is an entity for performing resource allocation for a UE, and may be at least one of a gNB, an eNode B (eNB), a Node B, a BS, a radio access unit, a base station controller (BSC), or a network node. A terminal may include a UE, an MS, a cellular phone, a smart phone, a computer, or a multimedia system capable of performing a communication function. Herein, downlink (DL) may refer to a radio transmission path for a signal transmitted from a BS to a UE, and uplink (UL) may refer to a radio transmission path for a signal transmitted from a UE to a BS. Although a new radio (NR) system will now be taken as an example, embodiments of the disclosure may be equally applied to various communication systems with similar technological backgrounds or channel types. Furthermore, embodiments of the disclosure will also be applied to different communication systems with some modifications to such an extent that does not significantly deviate the scope of the disclosure when judged by skilled people in the art.

In the disclosure, the conventional terms 'physical channel' and 'signal' may be interchangeably used with data or a control signal. For example, a PDSCH is a physical channel on which to transmit data, but in the disclosure, the PDSCH may be referred to as data.

In the disclosure, higher layer signaling is a method of transferring a signal to the UE from the BS on a DL data channel of the physical layer or to the BS from the UE on a UL data channel of the physical layer, and may also be referred to as RRC signaling or an MAC control element (CE).

In the meantime, as a study on next generation communication systems is being conducted these days, various schemes for scheduling communication with a UE are being discussed. Hence, an efficient scheduling and data transmission/reception scheme in consideration of characteristics of the next generation communication system is required.

In the communication system, a plurality of services may be provided for a user, and to provide such a plurality of services for the user, a method of providing the respective services to fit their characteristics in a same time interval and a corresponding apparatus are required.

FIG. 1 shows a transport structure of the time-frequency resource region, which is a radio resource region of a 5th generation (5G) or NR system.

Referring to FIG. 1, in the radio resource region, the horizontal axis represents the time domain, and the vertical axis represents the frequency domain. A minimum transmission unit in the time domain is an OFDM symbol, and $N_{symb}$ OFDM symbols 1-02 together define a slot 1-06. A subframe may be defined to be 1.0 ms long, and a radio frame 1-14 may be defined to be 10 ms long. A minimum transmission unit in the frequency domain is a subcarrier, and bandwidth of the whole system transmission band may be comprised of a total of $N_{BW}$ subcarriers 1-04. These specific numerical values may be, however, variously applied depending on the system.

A basic unit in the time-frequency resource region is a resource element 1-12 (RE), which may be represented by an OFDM symbol index and a subcarrier index. A resource block (RB) 1-08 or physical resource block (PRB) may be defined with $N_{symb}$ successive OFDM symbols 1-02 in the time domain and $N_{RB}$ successive subcarriers in the frequency domain. Accordingly, the one RB 1-08 may consist of $N_{symb} \times N_{RB}$ REs 1-12.

Generally, a minimum transmission unit of data is an RB. In the 5G or NR system, it is common that $N_{symb}$=14 and $N_{RB}$=12, and $N_{BW}$ and $N_{RB}$ may be proportional to the bandwidth of a system transmission band. A data rate may increase in proportion to the number of RBs scheduled for the UE. In the 5G or NR system, for an FDD system differentiating and operating DL and UL by frequency, DL transmission bandwidth may differ from UL transmission bandwidth. Channel bandwidth refers to RF bandwidth corresponding to the system transmission bandwidth. Table 1 represents correspondence between system transmission bandwidth and channel bandwidth defined in an LTE system for 4G wireless communication before the 5G or NR system. For example, the LTE system having 10 MHz channel bandwidth has transmission bandwidth of 50 RBs.

TABLE 1

| | Channel bandwidth BW$_{Channel}$ [MHz] | | | | | |
|---|---|---|---|---|---|---|
| | 1.4 | 3 | 5 | 10 | 15 | 20 |
| Transmission bandwidth configuration N$_{RB}$ | 6 | 15 | 25 | 50 | 75 | 100 |

The 5G or NR system may be operated in wider channel bandwidth than the channel bandwidth for LTE presented in table 1.

In the 5G or NR system, scheduling information on DL data or UL data is transferred through downlink control information (DCI) from the BS to the UE. The DCI may be defined in various formats, and depending on each format, the DCI may indicate whether it is scheduling information (UL grant) for UL data or scheduling information (DL grant) for DL data, whether it is compact DCI with small-sized control information, whether spatial multiplexing is applied using multiple antennas, whether it is DCI for power control, etc. For example, DCI format 1-1 that is scheduling control information for DL data (DL grant) may include one piece of the following control information:

carrier indicator: indicates which frequency carrier is used for transmission.

DCI format indicator: an indicator for distinguishing whether the DCI is for DL or UL.

bandwidth part (BWP) indicator: indicates which BWP is used for transmission.

frequency domain resource allocation: indicates an RB in the frequency domain allocated for data transmission. A resource represented according to system bandwidth and a resource allocation scheme is determined.

time domain resource allocation: indicates which slot and which OFDM symbol in the slot are used to transmit a data-related channel.

VRB-to-PRB mapping: indicates which scheme is used to map a virtual RB (VRB) index and a physical RB (PRB) index.

modulation and coding scheme (MCS): indicates a modulation scheme and a coding rate used for data transmission. Specifically, it may indicate a coding rate value that may give information about a transport block size (TBS) and channel coding along with information about whether it is quadrature phase shift keying (QPSK), 16 quadrature amplitude modulation (16 QAM), 64 QAM, or 256 QAM.

code block group (CBG) transmission information: indicates information about which CBG is transmitted when CBG retransmission is configured.

HARQ process number: indicates a process number of an HARQ.

new data indicator: indicates whether it is HARQ initial transmission or retransmission.

redundancy version: indicates a redundancy version of an HARQ.

transmit power control (TPC) command for physical uplink control channel (PUCCH): indicates a transmit power control command for UL control channel PUCCH.

For the PUSCH transmission, time domain resource allocation may be delivered by information about a slot in which a PUSCH is transmitted, a start symbol position S in the slot, and the number L of symbols to which the PUSCH is mapped. The S may be a relative position from the beginning of the slot, the L may be the number of successive symbols, and the S and L may be determined from a start and length indicator value (SLIV) defined as follows:

if (L − 1) ≤ 7 then
    SLIV = 14 · (L − 1) + S
else
    SLIV = 14 · (14 − L + 1) + (14 − 1 − S)
where 0 < L ≤ 14 − S The 5G or NR system may be configured with a table including information about an SLIV value, a PUSCH mapping type, and a slot in which the PUSCH is transmitted in a row commonly through RRC configuration. Subsequently, time domain resource allocation in DCI indicates an index value in the configured table, so that the BS may deliver information about an SLIV value, a PUSCH mapping type, and a slot in which the PUSCH is transmitted to the UE.

In the 5G or NR system, type A and type B are defined for the PUSCH mapping type. For the PUSCH mapping type A, the first of demodulation reference signal (DMRS) symbols may be located in the second or third OFDM symbol in a slot. For the PUSCH mapping type B, the first of DMRS symbols may be located in the first OFDM symbol in a time domain resource allocated in PUSCH transmission.

DCI may be transmitted on a physical downlink control channel (PDCCH) (or control information, which is interchangeably used with the PDCCH) after going through channel coding and modulation processes.

In general, DCI is scrambled by a specific radio network temporary identifier (RNTI) separately for each UE, having cyclic redundancy check (CRC) added thereto, channel-coded, and then configured and transmitted in a separate PDCCH. The PDCCH is mapped and transmitted in a control resource set (CORESET) configured for the UE.

DL data may be transmitted on a physical downlink shared channel (PDSCH), which is a physical channel for DL data transmission. The PDSCH may be transmitted after a control channel transmission interval, and scheduling information such as a specific mapping position in the frequency domain, modulation scheme, etc., is determined based on the DCI transmitted through the PDCCH.

Through an MCS of the control information that makes up the DCI, the BS notifies the UE of a modulation scheme applied to the PDSCH for transmission and the size of data to be transmitted (transport block size; TBS). In an embodiment, an MCS may be configured in 5 bits or more than or less than 5 bits. The TBS corresponds to the size of a transport block (TB) to be transmitted by the BS before channel coding for error correction is applied to the data.

In the disclosure, the transport block (TB) may include a medium access control (MAC) header, a MAC control element (CE), one or more MAC service data units (MAC SDU), and padding bits. Alternatively, the TB may refer to a data unit or a MAC protocol data unit (MAC PDU) sent down to the physical layer from the MAC layer.

The 5G or NR system supports the following modulation schemes: QPSK (Quadrature Phase Shift Keying), 16 QAM (Quadrature Amplitude Modulation), 64 QAM, and 256 QAM, and their respective modulation orders Qm are 2, 4, 6, and 8. For example, two bits per symbol may be transmitted for QPSK modulation, 4 bits per symbol for 16 QAM modulation, 6 bits per symbol for 64 QAM modulation, and 8 bits per symbol for 256 QAM modulation.

Figure 2:
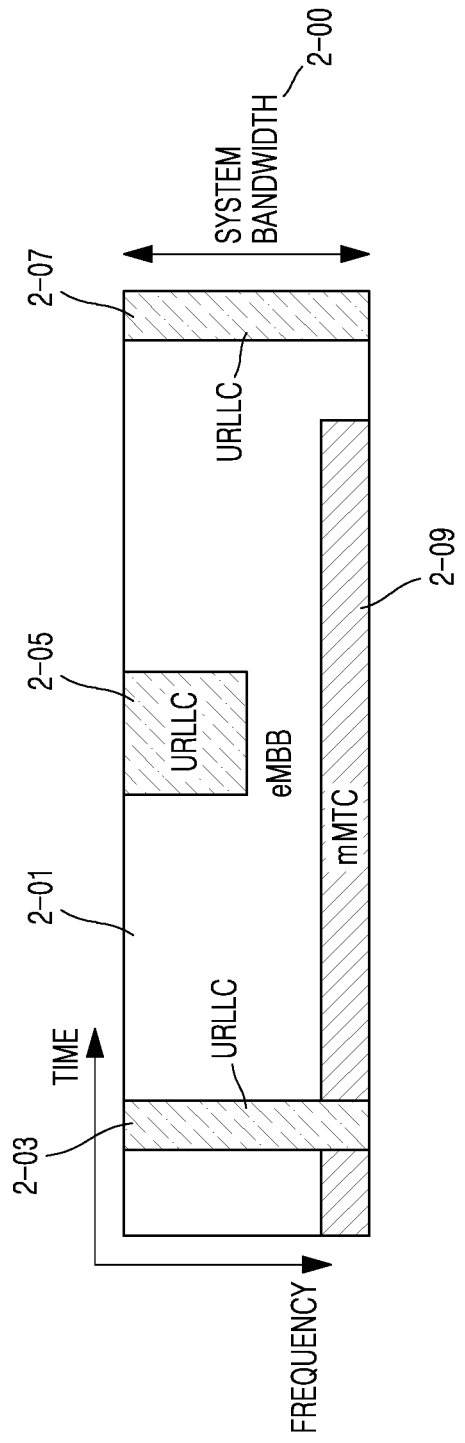
FIG. 2 is a view for describing how to allocate data for eMBB, URLLC, and mMTC in time-frequency resource region in a 5G or NR system, according to an embodiment of the disclosure.

FIG. 2 is a view for describing how to allocate data for eMBB, URLLC, and mMTC in time-frequency resource region in a 5G or NR system, according to an embodiment of the disclosure.

Referring to FIG. 2, data for eMBB, URLLC, and mMTC may be allocated in a whole system frequency band 2-00 in an embodiment of the disclosure. When URLLC data 2-03, 2-05, and 2-07 occurs and needs to be transmitted while eMBB 2-01 and mMTC 2-09 are allocated and being transmitted in a particular frequency band, the URLLC data 2-03, 2-05, and 2-07 may be transmitted without emptying or transmitting a part already allocated the eMBB 2-01 and the mMTC 2-09. Of the aforementioned services, URLLC requires reduction in latency, so that the URLLC data 2-03, 2-05, and 2-07 may be allocated and transmitted in a portion of the resource allocated the eMBB data 2-01. When URLLC is further allocated and transmitted in a resource allocated eMBB, the eMBB data may not be transmitted in the overlapping frequency-time resource, and accordingly, transmission performance for the eMBB data may be reduced. In other words, in this case, eMBB data transmission failure may occur due to the URLLC allocation.

Figure 3:
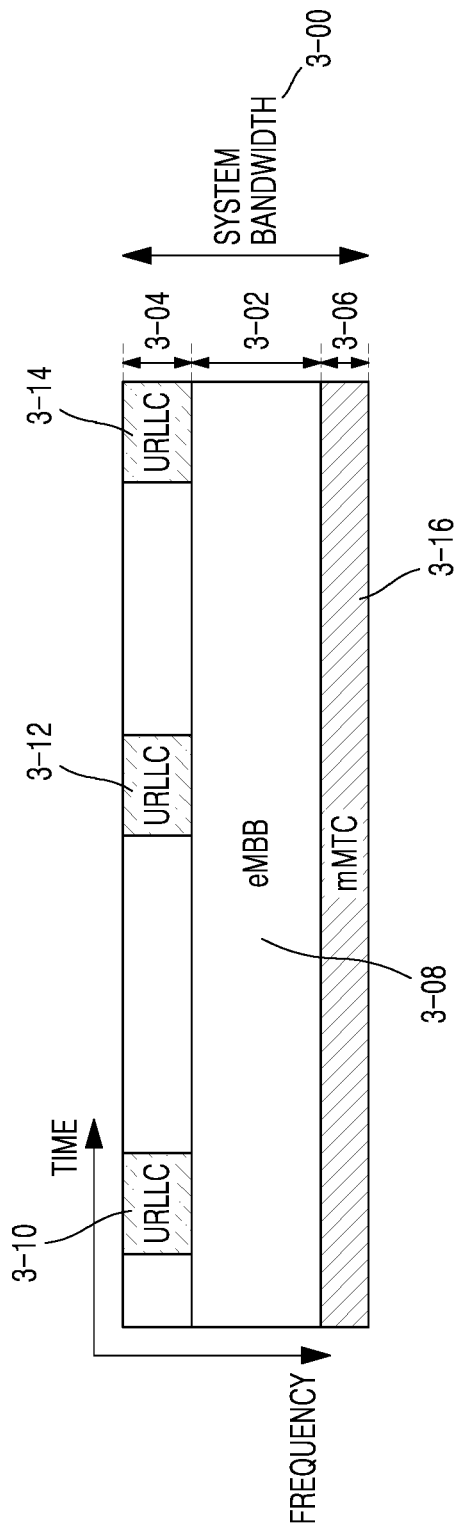
FIG. 3 is a view for describing how to allocate data for eMBB, URLLC, and mMTC in a frequency-time resource region in a 5G or NR system, according to another embodiment of the disclosure.

FIG. 3 is a view for describing how to allocate data for eMBB, URLLC, and mMTC in a frequency-time resource region in a 5G or NR system, according to another embodiment of the disclosure.

Referring to FIG. 3, in another embodiment of the disclosure, a whole system frequency band 3-00 may be divided into respective sub-bands 3-02, 3-04, and 3-06 to be used for transmitting services and data. Information relating to sub-band configuration may be predetermined. In an embodiment, the information may be transmitted by a BS to a UE through higher signaling. Alternatively, information regarding the respective sub-bands may be configured arbitrarily by the BS or a network node to provide services for the UE without transmission of separate sub-band configuration information. In FIG. 3, the sub-band 3-02 may be used for eMBB data transmission, the sub-band 3-04 may be used for URLLC data transmission, and the sub-band 3-06 may be used for mMTC data transmission.

In overall embodiments, length of a transmission time interval (TTI) used for URLLC transmission may be shorter than a TTI length used for the eMBB or mMTC transmission. Furthermore, a response to information regarding the URLLC may be transmitted faster than the eMBB or the mMTC, and accordingly, the information may be transmitted or received with low latency. To transmit the aforementioned three services or data, physical layer channels used for the respective types may have different structures. For example, at least one of a length of transmission time interval (TTI), a frequency resource allocation unit, a control channel structure, and a data mapping method may be different.

Although three types of service and three types of data are illustrated in the aforementioned embodiment, there may be more types of services and corresponding data, and even in this case, descriptions of the disclosure may be applied.

In describing a method and apparatus proposed in embodiments of the disclosure, the terms physical channel and signal in the 5G or NR system may be used. However, the disclosure may be applied not only to the 5G or NR system but also to other wireless communication systems.

Figure 4:
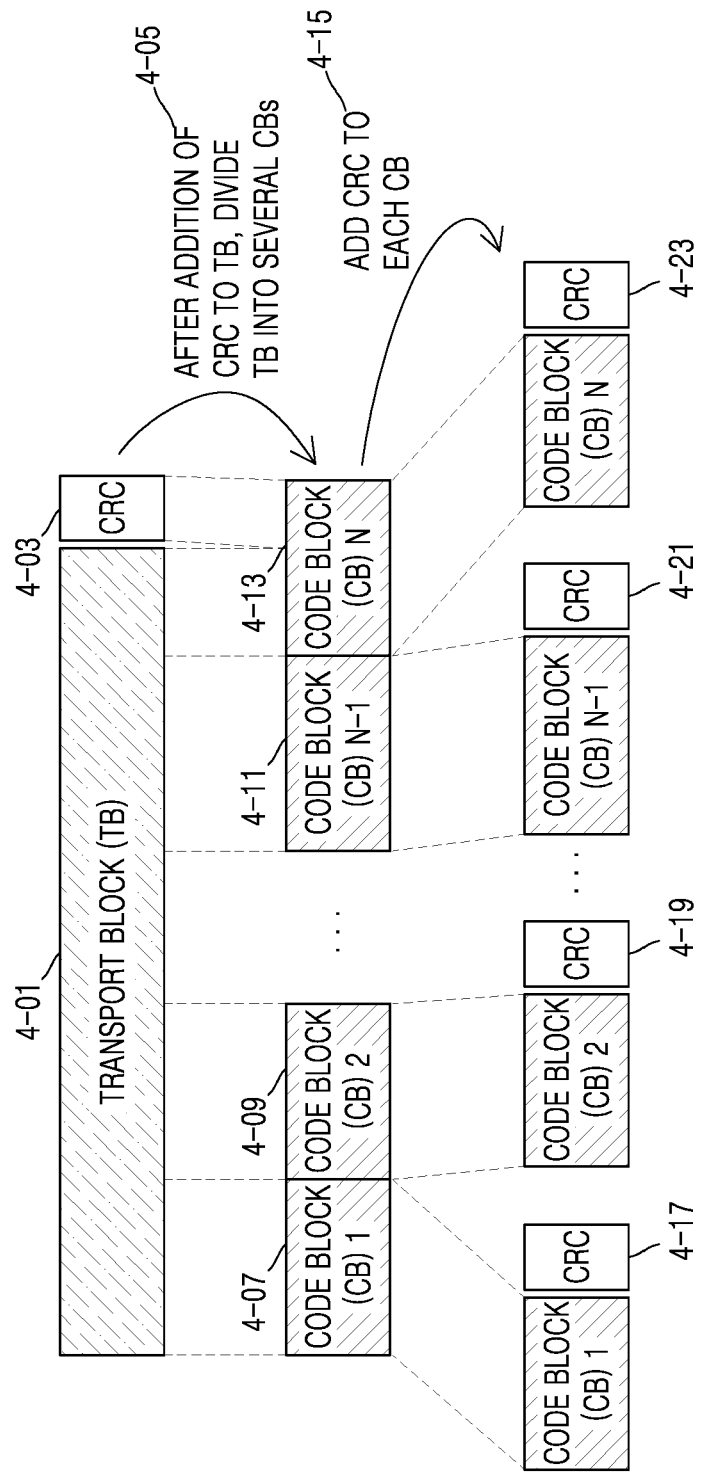
FIG. 4 is a view for describing a structure in which a transport block is divided into multiple code blocks and CRC is added thereto, according to an embodiment of the disclosure.

FIG. 4 is a view for describing a structure in which a transport block is divided into multiple code blocks and CRC is added thereto, according to an embodiment of the disclosure.

Referring to FIG. 4, one transport block (TB) 4-01 to be transmitted in UL or DL may have cyclic redundancy check (CRC) 4-03 added to the first or last part. The CRC may be in 16 or 24 bits, or in a prefixed number of bits, or in a variable number of bits depending on e.g., the channel condition, and may be used in determining whether channel coding is successful. A block with the TB 4-01 and the CRC 4-03 added thereto may be divided into several code blocks CBs 4-07, 4-09, 4-11, and 4-13, in 4-05. These code blocks 4-07, 4-09, 4-11, and 4-13 may be split with a maximum size defined in advance. In this case, the last code block 4-13 may be smaller in size than other code blocks, or may be lengthened to have the same length as the other code blocks by filling it with 0, a random value, or 1. CRCs 4-17, 4-19, 4-21, and 4-23 may be added to the split code blocks 4-07, 4-09, 4-11, and 4-13, respectively, in 4-15. The respective CRCs 4-17, 4-19, 4-21, and 4-23 may be in 16 bits, 24 bits, or in a prefixed number of bits, and used in determining whether channel coding is successful.

The TB 4-01 and a cyclic generator polynomial may be used to create the CRC 4-03. The cyclic generator polynomial may be defined in various methods. For example, assuming that cyclic generator polynomial for 24-bit CRC, $g_{CRC24A}(D)=D^{24}+D^{23}+D^{18}+D^{17}+D^{14}+D^{11}+D^{10}+D^{7}+D^{6}+D^{5}+D^{4}+D^{3}+D+1$, given L=24, CRC $p_0, p_1, p_2, p_3, \ldots, p_{L-1}$ for TB data $a_0, a_1, a_2, a_3, \ldots, a_{A-1}$ may be determined to be such a value that makes the remainder of division of $a_0D^{A+23}+a_1D^{A+22}+\ldots+a_{A1}D^{24}+p_1D^{22}+\ldots+_{23}$ by $g_{CRC24A}(D)$ zero. Although the CRC length L is assumed as 24 in this embodiment, it is an example, and the length may be determined to be any of various lengths 12, 16, 24, 32, 40, 48, 64, etc. After the CRC 4-03 is added to the TB 4-01 in the procedure, the resultant TB may be divided into N CBs 4-07, 4-09, 4-11, and 4-13. The CRCs 4-17, 4-19, 4-21 and 4-23 may be added to the split CBs 4-07, 4-09, 4-11, and 4-13, respectively, in 4-15. For the CRCs added to the respective split CBs 4-07, 4-09, 4-11, and 4-13, CRCs having different length or different cyclic generator polynomial than when the CRC 4-03 added to the TB 4-01 is generated may be used. Alternatively, the CRC 4-03 added to the TB 4-01 and the CRCs 4-17, 4-19, 4-21, and 4-23 added to the code blocks may be omitted depending on a type of channel code to be applied to the code blocks. For example, when LDPC codes are applied to the code blocks instead of turbo codes, the CRCs 4-17, 4-19, 4-21, and 4-23 that would otherwise be inserted to every code block may be omitted. Alternatively, even when the LDPC is applied, the CRCs 4-17, 4-19, 4-21, and 4-23 may be added to the code blocks as they are. Moreover, even when polar codes are used, the CRCs may be added or omitted.

As shown in FIG. 4, for a TB to be transmitted, a maximum length is defined for a code block based on the type of channel coding applied, and division of the TB and the CRC added to the TB into code blocks is performed based on the maximum length of the code block. In the LTE system, a CRC for CB may be added to a split CB, and coded bits may be determined by encoding data bits and the CRC of the CB with channel codes, and the number of bits to be rate-matched as agreed for the respective coded bits may be determined.

Figure 5:
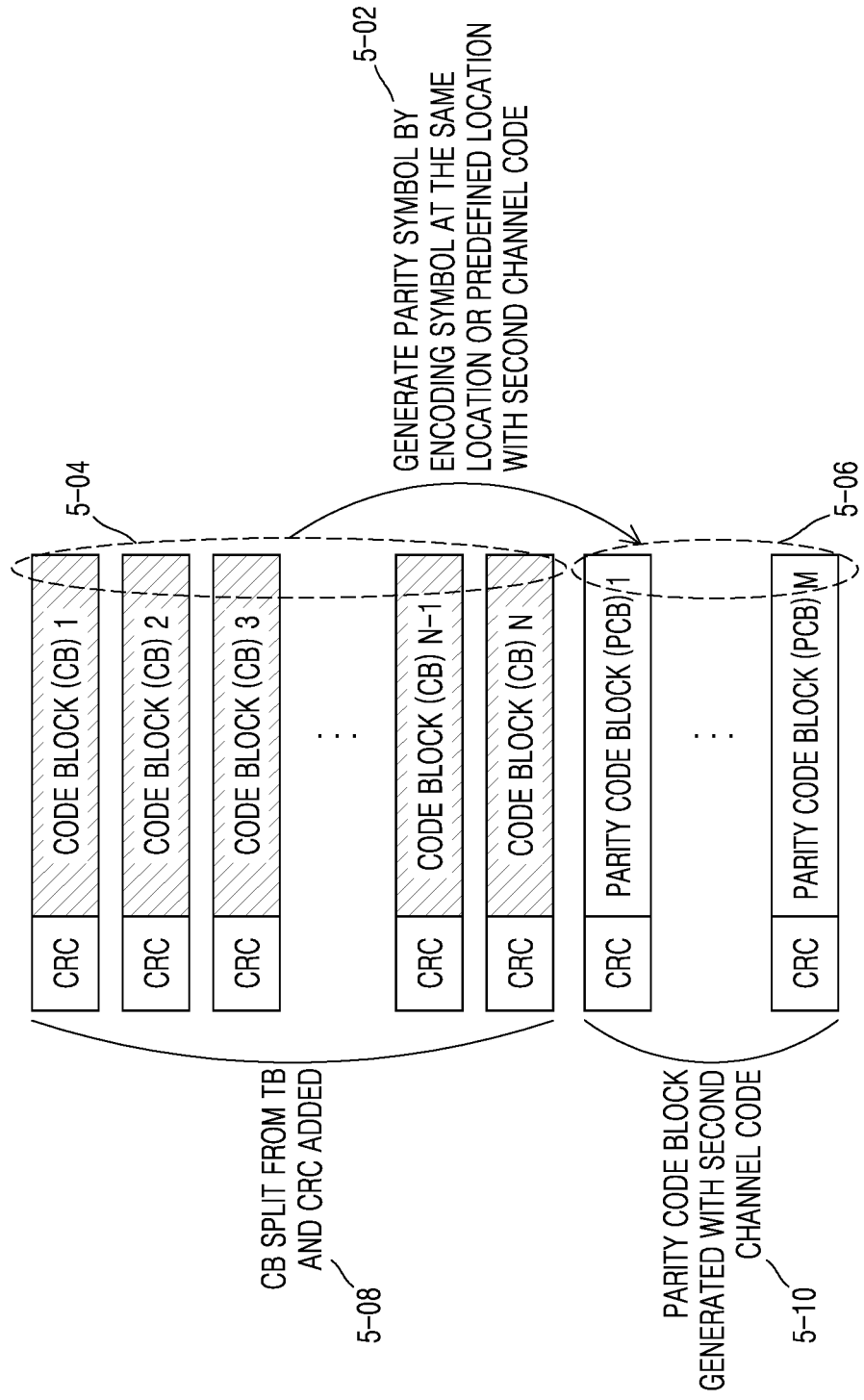
FIG. 5 is a diagram for describing a coding structure with application of an outer code, according to an embodiment of the disclosure.
Figure 6:
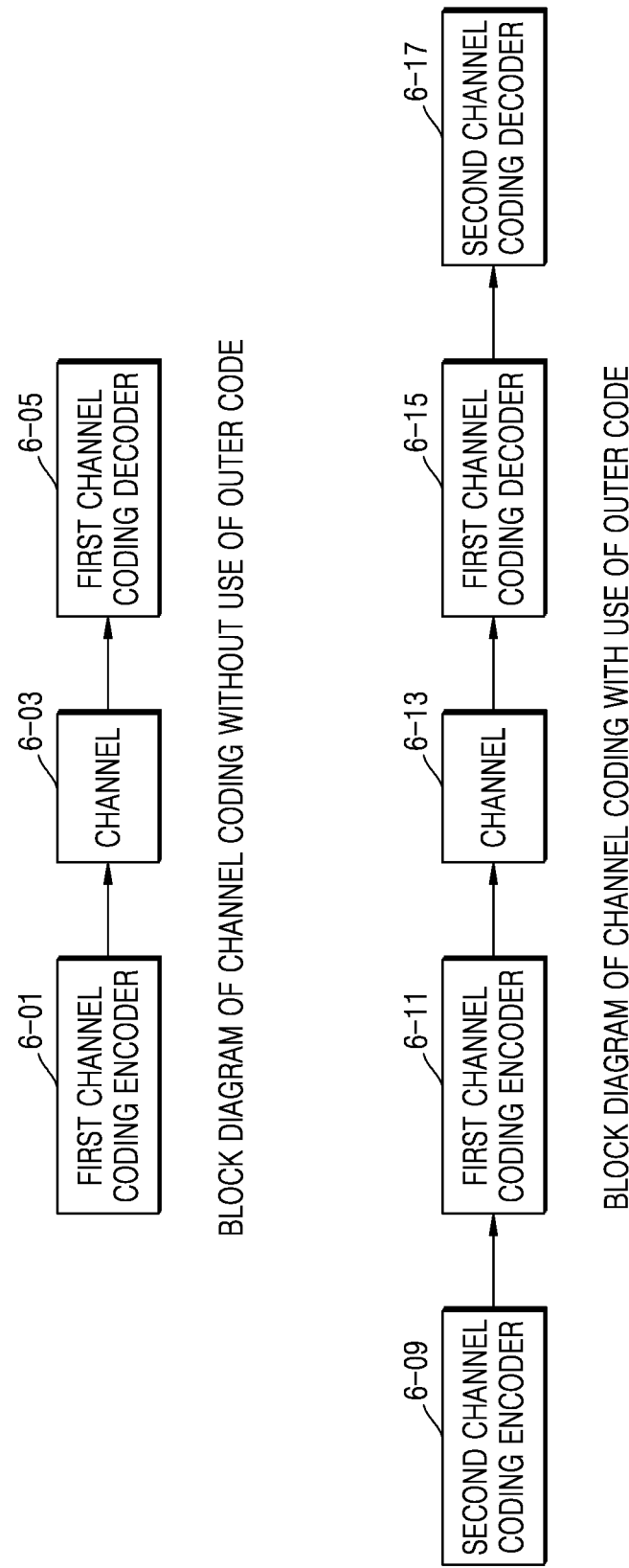
FIG. 6 is a diagram for describing an operation procedure according to whether an outer code is applied, according to an embodiment of the disclosure.

FIG. 5 is a diagram for describing a coding structure with application of an outer code, according to an embodiment of the disclosure, and FIG. 6 is a diagram for describing an operation procedure according to whether an outer code is applied, according to an embodiment of the disclosure.

Referring to FIGS. 5 and 6, a method of transmitting a signal using an outer code will be focused.

Referring to FIG. 5, a transport block may be divided into several code blocks, and then bits or symbols 5-04 at the same position in the respective code blocks are encoded with a second channel code, thereby generating parity bits or symbols 5-06, in 5-02. Subsequently, CRCs may be added to the respective code blocks and parity code blocks generated through second channel code encoding, in 5-08 and 5-10. Whether to add the CRC may depend on the type of channel code. For example, when a turbo code is used as a first channel code, the CRCs 5-08 and 5-10 may be added, and subsequently the respective code blocks and parity code blocks may be encoded through first channel code encoding. In the disclosure, the first channel code may be e.g., a convolutional code, an LDPC code, a turbo code, a polar code, etc. It is not, however, limited thereto, and various channel codes may be applied. In the disclosure, for the second channel code, for example, a Reed-Solomon code, a BCH code, a Raptor code, a parity bit generation code, etc., may be used. It is not, however, limited thereto, and various channel codes may be applied as the second channel code.

Referring to FIG. 6, in a case that the outer code is used, data to be transmitted passes a second channel coding encoder 6-09. Bits or symbols having passed the second channel coding encoder 6-09 pass a first channel coding encoder 6-11. When the channel coded symbols pass a channel 6-13 and arrive at the receiver, the receiver may sequentially operate a first channel coding decoder 6-15 and a second channel coding decoder 6-17 based on the received signal. The first channel coding decoder 6-15 and the second channel coding decoder 6-17 may perform operations corresponding to the first channel coding encoder 6-11 and the second channel coding encoder 6-09, respectively.

On the contrary, in a channel coding process without use of an outer code, the transmitter and the receiver use only the first channel coding encoder 6-11 and the first channel coding decoder 6-05, respectively, in which case a second channel coding encoder and a second channel coding decoder are not used. Even in the case that the outer code is not used, the first channel coding encoder 6-11 and the first channel coding decoder 6-05 may be configured equally as in a case where the outer code is used.

Figure 7:
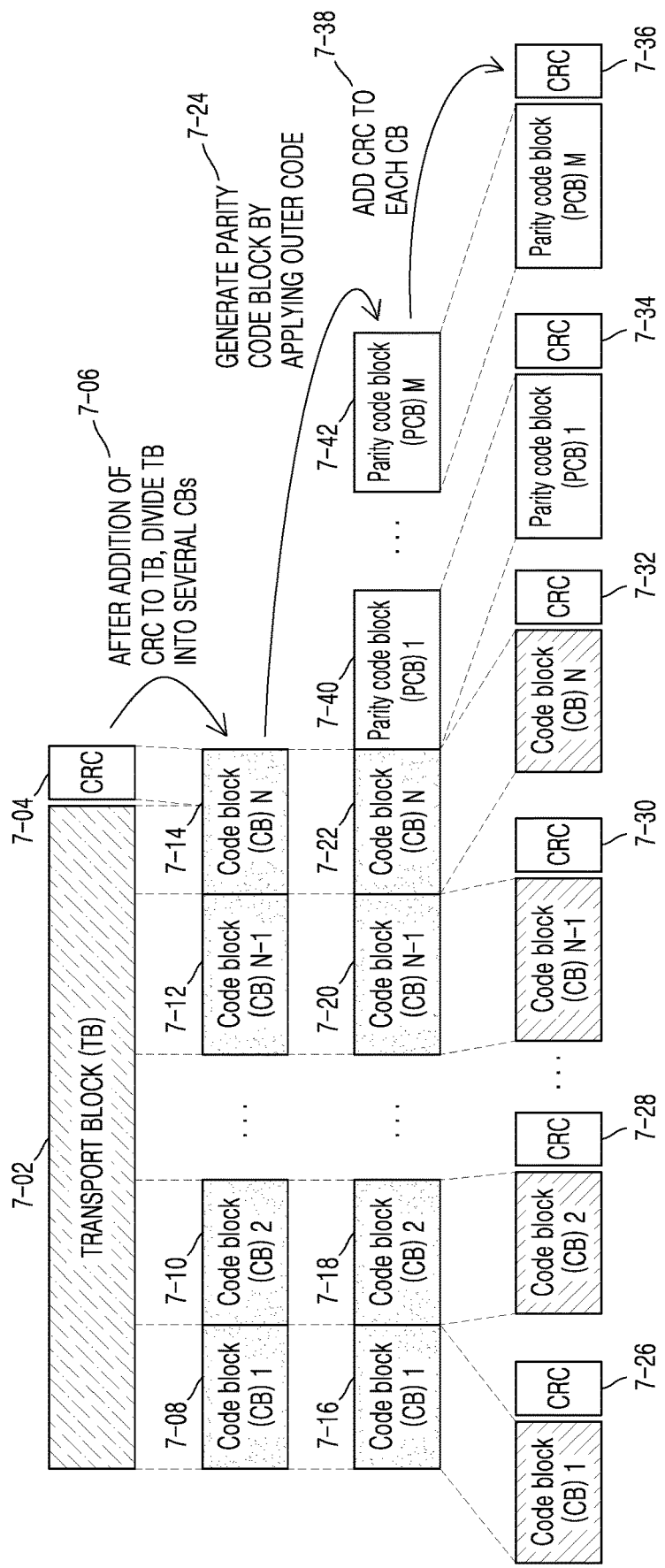
FIG. 7 is a view for describing a structure in which a transport block is divided into multiple code blocks and an outer code is applied thereto to generate a parity code block, according to an embodiment of the disclosure.

FIG. 7 is a view for describing a structure in which a transport block is divided into multiple code blocks and an outer code is applied thereto to generate a parity code block, according to an embodiment of the disclosure.

Referring to FIG. 7, a transport block is divided into several code blocks, and then a second channel code or an outer code may be applied thereto to generate one or more parity code blocks. As described above in connection with FIG. 4, a transport block may be divided into one or more code blocks. In this case, when only one code block is generated due to the size of the transport block, a CRC may not be added to the code block. When an outer code is applied to the code blocks to be transmitted, parity code blocks 7-40 and 7-42 may be generated in 7-24. When the outer code is used, the parity code blocks may be located after the last code block. After the outer code, CRCs 7-26, 7-28, 7-30, 7-32, 7-34, and 7-36 may be added, in 7-38 Subsequently, the respective code blocks and parity code blocks with the CRCs may be encoded with a channel code.

As the UE is generally separated from a BS, a signal transmitted from the UE is received by the BS with a propagation delay. The propagation delay is a value obtained by dividing a path a radio wave is propagated from the UE to the BS by the speed of light, and may generally be a value obtained by dividing a distance from the UE to the BS by the speed of light. In an embodiment, in a case of a UE located 100 km away from a BS, a signal transmitted by the UE is received by the BS after about 0.34 msec. Even a signal transmitted from the BS is received by the UE after about 0.34 msec. As described above, depending on the distance between the UE and the BS, the time taken for a signal transmitted from the UE to arrive at the BS may vary. Accordingly, when multiple UEs placed in different locations simultaneously transmit signals, times taken for the signals to arrive at the BS may all be different. To address this phenomenon and make the signals transmitted from the multiple UEs simultaneously arrive at the BS, the respective UEs may have different transmission timing. This is called timing advance in the 5G, NR, and LTE system.

Figure 8:
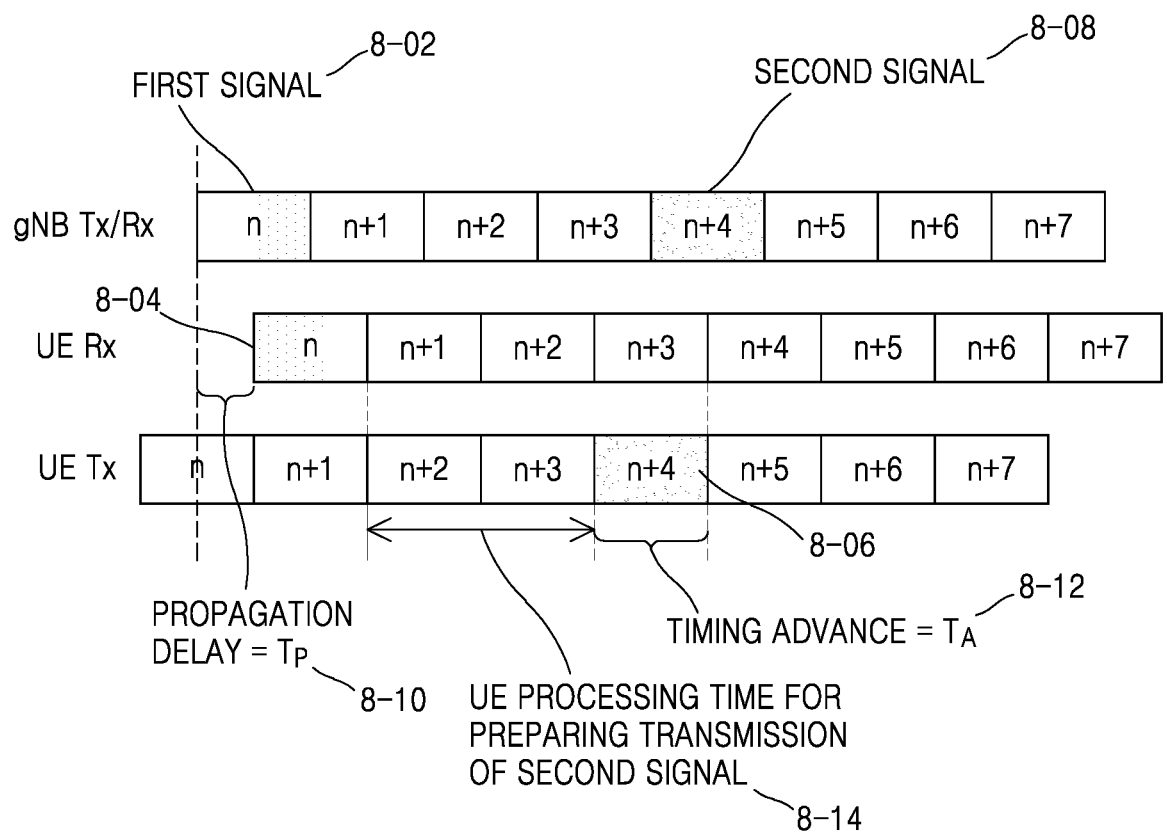
FIG. 8 is a view for describing processing time of a UE based on timing advance, when the UE receives a first signal and in response, transmits a second signal in a 5G or NR system, according to an embodiment of the disclosure.

FIG. 8 is a view for describing processing time of a UE based on timing advance, when the UE receives a first signal and in response, transmits a second signal in a 5G or NR system, according to an embodiment of the disclosure.

Referring to FIG. 8, when the BS transmits UL scheduling grant, or a DL control signal and data to the UE in slot n 8-02, the UE may receive the UL scheduling grant, or the DL control signal and data in the slot n 8-04. In this case, the reception at the UE may be delayed by the propagation delay $T_P$ 8-10 from the transmission time at the BS. In the embodiment, when a first signal is received in slot n 8-04, the UE transmits a corresponding second signal in slot n+4 8-06. Even when the UE transmits a signal to the BS, the UE may transmit UL data or HARQ ACK/NACK for DL data at a time 8-06 advanced by timing advance $T_A$ 8-12 from the slot n+4 based on the signal received by the UE in order to make the signal arrive at the BS at a particular time. Accordingly, in the embodiment, time 8-14 for the UE to prepare to transmit UL data after receiving UL scheduling grant or deliver HARQ ACK or NACK after receiving DL data may be a period of time corresponding to three slots except for $T_A$.

To determine the timing, the BS may calculate an absolute value of $T_A$ of the corresponding UE. When initially accessed by the UE, the BS may calculate the absolute value of $T_A$ by adding to or subtracting from a value of $T_A$ delivered to the UE for the first time in a random access process an amount of change in the value of $T_A$ subsequently delivered by higher signaling. In the disclosure, the absolute value of $T_A$ may be a value resulting from subtracting a start time of the n'th TTI received by the UE from a start time of the n'th TTI transmitted by the UE.

In the meantime, one of important factors for cellular wireless communication system capabilities is packet data latency. For this, in the LTE system, a signal is transmitted or received in the unit of a subframe having a transmission time interval (TTI) of 1 ms. The LTE system operating as described above may support a UE having a TTI shorter than 1 ms (short-TTI UE). On the other hand, in the 5G or NR system, a TTI may be shorter than 1 ms. The short-TTI UE is suitable for services such as a voice over LTE VoLTE) service for which latency is important or a remote control service. The short-TTI UE is also a means for substantializing cellular based mission-critical Internet of Things (IoT).

In the 5G or NR system, when the BS transmits a PDSCH including DL data, DCI that schedules the PDSCH indicates a value of $K_1$ corresponding to timing information at which the UE transmits HARQ-ACK information for the PDSCH. Unless the HARQ-ACK information is indicated to be transmitted earlier than symbol $L_1$ with timing advance included, the UE may transmit the HARQ-ACK information to the BS. In other words, the HARQ-ACK information may be transmitted from the UE to the BS at the same timing as or later than the symbol $L_1$ with the timing advance included. When the HARQ-ACK information is indicated to be transmitted earlier than the symbol $L_1$ with the timing advance included, the HARQ-ACK information may not be valid HARQ-ACK information in the HARQ-ACK transmission from the UE to the BS. The symbol $L_1$ may be the first symbol in which cycle prefix (CP) starts after $T_{proc,1}$ from the last point in time of the PDSCH. $T_{proc,1}$ may be calculated as in Equation 1 below:

$$T_{proc,1} = ((N_1 + d_{1,1} + d_{1,2})(2048 + 144) \cdot \kappa 2^{-\mu}) \cdot T_C \quad \text{Equation 1}$$

In Equation 1, $N_1$, $d_{1,1}$, $d_{1,2}$, $\kappa$, $\mu$, and $T_C$ may be defined as follows:

$d_{1,1}$=0 when HARQ-ACK information is transmitted on a PUCCH (UL control channel), and $d_{1,1}$=1 when HARQ-ACK information is transmitted on a PUSCH (UL shared channel, data channel).

when the UE is configured with a plurality of active configuration carriers or carriers, a maximum timing difference between the carriers may be reflected in transmission of the second signal.

for the PDSCH mapping type A, i.e., in a case that the first DMRS symbol is positioned in the third or fourth symbol of a slot, when the position index i of the last symbol of the PDSCH is smaller than 7, $d_{1,2}$ is defined to be 7-i.

for the PDSCH mapping type B, i.e., in a case that the first DMRS symbol is positioned in the first symbol of the PDSCH, $d_{1,2}$=3 when the PDSCH has the length of 4 symbols, or $d_{1,2}$=3+d when the PDSCH has the length of 2 symbols, where d is the number of overlapping OFDM symbols between the PDSCH and a PDCCH including a control signal for scheduling the PDSCH.

$N_1$ is defined according to $\mu$ as in the following Table 2. $\mu$=0, 1, 2, and 3 refer to subcarrier spacing 15 kHz, 30 kHz, 60 kHz, and 120 kHz, respectively.

TABLE 2

|   | PDSCH decoding time $N_1$ [symbols] | |
| --- | --- | --- |
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 | for the value of $N_1$ presented in Table 2, different values may be used depending on the UE capability.

$$T_c = 1/(\Delta f_{max} \cdot N_f), \Delta f_{max} = 480 \cdot 10^3 \, Hz, N_f = 4096, \kappa = T_s/T_c = 64, T_S = 1/(\Delta f_{ref} \cdot N_{f,ref}), \Delta f_{ref} = 15 \cdot 10^3 \, Hz, N_{f,ref} = 2048$$

may be defined.

Furthermore, in the 5G or NR system, when the BS transmits control information including UL scheduling grant, the UE may indicate a value of $K_2$ corresponding to information of timing at which the UE transmits UL data or a PUSCH.

Unless the PUSCH is indicated to be transmitted earlier than symbol $L_2$ with timing advance included, the UE may transmit the PUSCH to the BS. In other words, the PUSCH may be transmitted from the UE to the BS at the same timing as or later than the symbol $L_2$ with the timing advance included. When the PUSCH is indicated to be transmitted earlier than symbol $L_2$ with the timing advance included, the UE may ignore the UL scheduling grant control information from the BS. The symbol $L_2$ may be the first symbol in which cycle prefix (CP) of a PUSCH symbol to be transmitted starts after $T_{proc,2}$ from the last point in time of the PDCCH including the scheduling grant. $T_{proc,2}$ may be calculated as in Equation 2 below:

$$T_{proc,2} = ((N_2 + d_{2,1})(2048 + 144) \cdot \kappa 2^{-\mu}) \cdot T_C \quad \text{Equation 2}$$

In Equation 2, $N_2$, $d_{2,1}$, $\kappa$, $\mu$, and $T_C$ may be defined as follows:

when the first of symbols allocated the PUSCH includes only DMRS, $d_{2,1}$=0, and otherwise, $d_{2,1}$=1.

when the UE is configured with a plurality of active configuration carriers or carriers, a maximum timing difference between the carriers may be reflected in transmission of the second signal.

$N_2$ is defined according to μ as in the following Table 3. μ=0, 1, 2, and 3 refer to subcarrier spacing 15 kHz, 30 kHz, 60 kHz, and 120 kHz, respectively.

TABLE 3

| μ | PUSCH preparation time $N_2$ [symbols] |
|---|---|
| 0 | 10 |
| 1 | 12 |
| 2 | 23 |
| 3 | 36 | for the value of $N_2$ presented in Table 3, different values may be used depending on the UE capability.

$T_c=1/(\Delta f_{max} \cdot N_f), \Delta f_{max}=480 \cdot 10^3 \, Hz, N_f=4096, \kappa=T_s/T_c=64, T_s=1/(\Delta f_{ref} \cdot N_{f,ref}), \Delta f_{ref}=15 \cdot 10^3 \, Hz, N_{f,ref}=2048$ may be defined.

In the meantime, in the 5G or NR system, a frequency bandwidth part (BWP) is configured in a carrier, and a particular UE may be designated to perform transmission or reception in the configured BWP. This may aim at reducing consumption power of the UE. The BS may configure a plurality of BWPs, and switch an active BWP in the control information. Time used by the UE to switch the BWP may be defined as in the following Table 4.

TABLE 4

| Frequency Range | Scenario | Type 1 Delay (us) | Type 2 Delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 4, frequency range 1 refers to a range of frequencies equal to or lower than 6 GHz, and frequency range 2 refers to a range of frequencies higher than 6 GHz. In the embodiment, type 1 and type 2 may be determined based on UE capabilities. In the embodiment, scenarios 1, 2, 3, and 4 are gives as in the following Table 5.

TABLE 5

|  | Variable center frequency | Invariable center frequency |
|---|---|---|
| Variable frequency bandwidth | Scenario 3 | Scenario 2 |
| Invariable frequency bandwidth | Scenario 1 | Scenario 4 when subcarrier spacing is changed |

In the disclosure, a BWP switching command being present in the control information or BWP switching being triggered may mean that BWP information indicated by a BWP indicator is different from a currently active BWP so that the BWP is going to be switched. On the contrary, when a BWP is indicated to be the same as the currently active BWP, there may be no BWP switching command.

In an embodiment, a device may determine a processing time in consideration of time required to switch a BWP when calculating a minimum processing time for transmission of HARQ-ACK for a PDSCH or a PUSCH. This will now be described with reference to FIGS. 9, 10, and 11.

Figure 9:
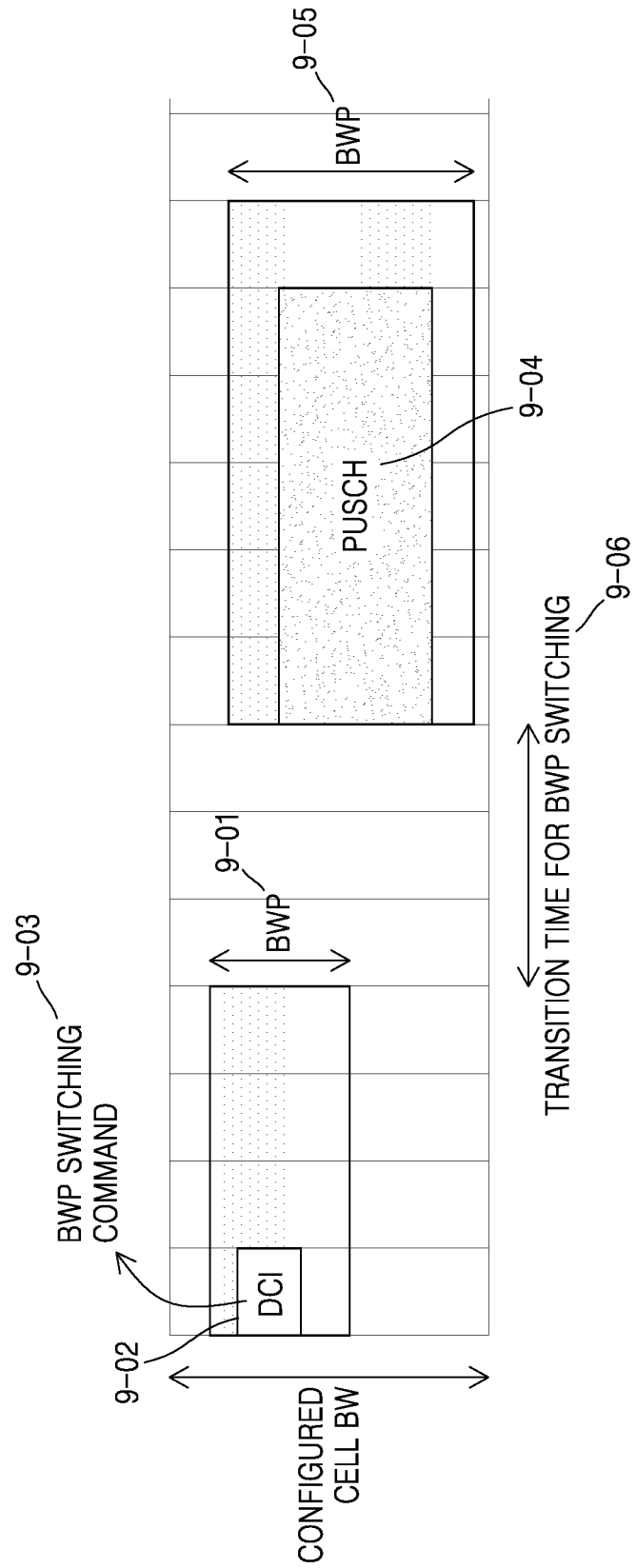
FIG. 9 is a view for describing a method including a BWP switching command when control information including uplink scheduling grant is transmitted, according to an embodiment of the disclosure.

FIG. 9 is a view for describing a method including a BWP switching command when control information including uplink scheduling grant is transmitted, according to an embodiment of the disclosure. Referring to FIG. 9, when DCI 9-02 including UL scheduling grant is transmitted in a particular BWP 9-01, it includes a BWP switching command 9-03.

DCI 9-02 schedules a PUSCH 9-04 and indicates to switch the BWP to a new BWP 9-05. In this case, the UE may transmit the PUSCH by switching the BWP within a set time. A time required to switch the BWP may be defined as in the following Table 4. It is, however, an example, and the time required to switch the BWP may not be limited to a value in Table 4 but may be changed to other various values to be applied.

Figure 10:
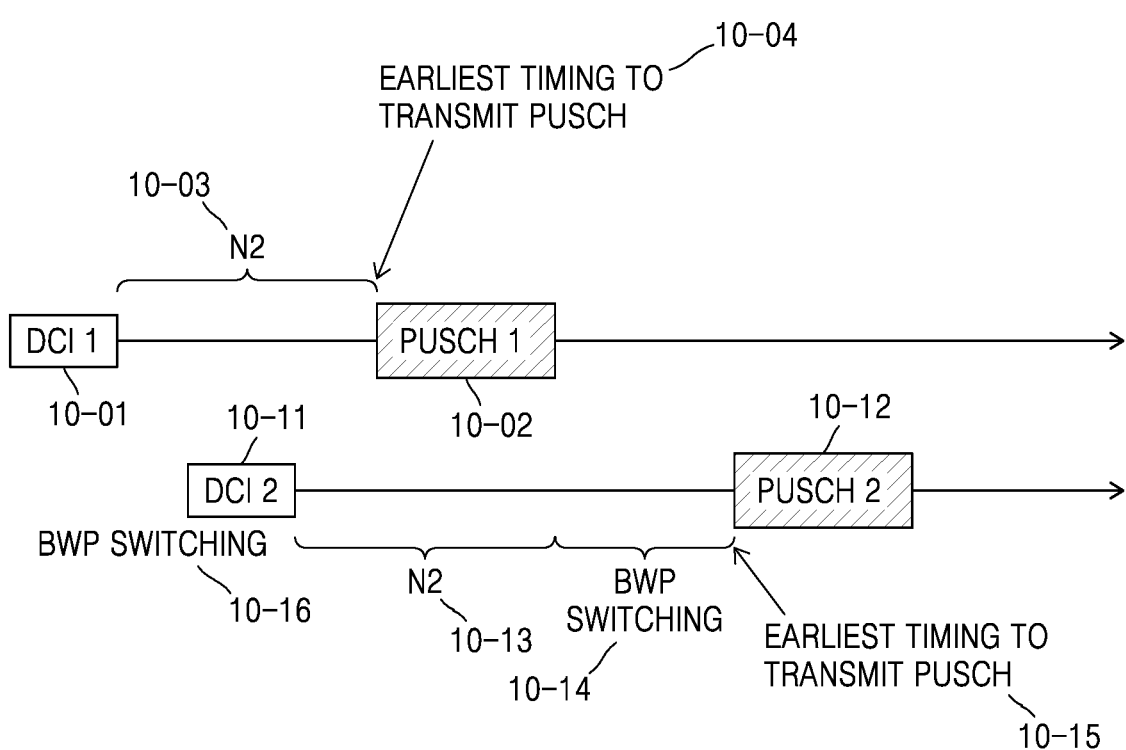
FIG. 10 is a view for describing a method by which processing time for transmission of a second signal increases when there is a BWP switching command, according to an embodiment of the disclosure.

FIG. 10 is a view for describing a method by which processing time for transmission of a second signal increases when there is a BWP switching command, according to an embodiment of the disclosure.

When DCI 1 10-01 schedules PUSCH 1 10-02, such factors as N2 10-3 may be taken into account in a procedure where the UE receives the DCI 1 and then transmits the PUSCH 1. This may have been reflected as values of N1 and N2 in Equations 1 and 2 according to DL scheduling and UL scheduling.

In the meantime, when DCI 2 10-11 including a BWP switching command 10-16 schedules PUSCH 2 10-12, not only such a factor as N2 but also time 10-14 for BWP switching may be taken into account in a procedure where the UE receives the DCI 2 and then transmits the PUSCH 2.

Specifically, $L_1$ and $L_2$ may be calculated by adding the BWP switching time presented in Table 4 to $T_{proc,1}$ and $T_{proc,2}$ expressed in Equation 1 and Equation 2. In this case, symbol $L_1$ may refer to a first symbol in which cyclic prefix (CP) starts after $T_{proc,1}$+a from the last point in time of the PDSCH, and symbol $L_2$ may refer to a first symbol in which CP starts after $T_{proc,2}$+a from the last point in time of the PDCCH. In the embodiment, a refers to time required for BWP switching.

In another method for taking into account the time for BWP switching 10-14, it may be agreed that the UE transmits HARQ-ACK information to the BS unless the HARQ-ACK information is indicated to be transmitted earlier than symbol $L_1$ with timing advance and BWP switching time included and that the UE transmits a PUSCH to the BS unless the PUSCH is indicated to be transmitted earlier than symbol $L_2$ with timing advance and BWP switching time included. In this case, symbol $L_1$ may refer to a first symbol in which cyclic prefix (CP) starts after $T_{proc,1}$ from the last point in time of the PDSCH, and symbol $L_2$ may refer to a first symbol in which CP starts after $T_{proc,2}$ from the last point in time of the PDCCH. In the embodiment, the BS and the UE may calculate actual time available for transmission of the second signal by adding the timing advance and the BWP switching time additionally to the calculated $L_1$ and $L_2$.

Although PUSCH transmission based on UL scheduling information is focused as an example in the embodiment, the BWP switching time may be taken into account even when minimum time to transmit the HARQ-ACK information in response to PDSCH transmission is determined.

Figure 11:
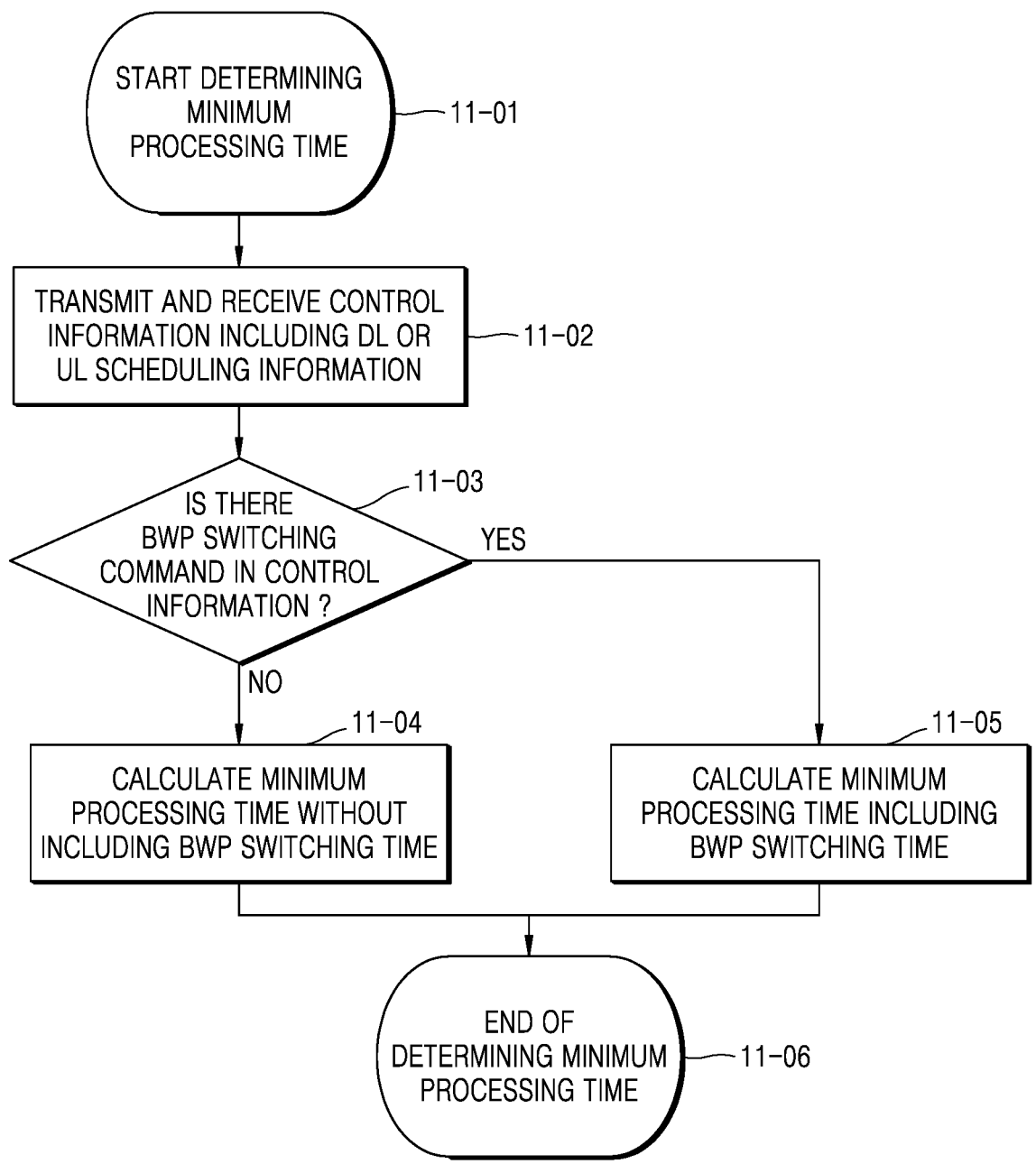
FIG. 11 is a flowchart for describing operations performed by a BS and a UE in determining a minimum processing time or available time for transmission of a second signal, according to an embodiment of the disclosure.

FIG. 11 is a flowchart for describing operations performed by a BS and a UE in determining a minimum processing time or available time for transmission of a second signal, according to an embodiment of the disclosure.

Referring to FIG. 11, when the BS and the UE respectively transmits and receives control information about a first signal in operation 11-02, it is determined whether there is a BWP switching command in the control information in operation 11-03. When there is no BWP switching command in the control information, the minimum processing time is calculated without including BWP switching time, in operation 11-04. Otherwise, when there is a BWP switching command in the control information, the minimum processing time is calculated by including BWP switching time, in operation 11-05.

In the disclosure, the minimum processing time may refer to the earliest time at which to transmit the second signal. This may be a process of calculating $L_1$ and $L_2$, or a process of calculating $T_{proc,1}$ or $T_{proc,2}$, or a process of calculating a time to actually transmit the second signal.

In an embodiment, Equation 1 may be replaced by following Equation 3 to calculate $T_{proc,1}$ to take into account the BWP switching time.

$$T_{proc,1} = ((N_1 + d_{1,1} + d_{1,2} + d_{1,3})(2048+144) \cdot \kappa 2^{-\mu}) \cdot T_C \quad \text{Equation 3}$$

Parameters $N_1$, $d_{1,1}$, $d_{1,2}$, $\kappa$, $\mu$, and $T_C$ in Equation 3 may be defined equally as in Equation 1, and $d_{1,3}$ may be a parameter for taking the BWP switching time into account. For example, when the BWP switching command is delivered in the control information, $d_{1,3}$ may have a value defined to be greater than 0. When there is no BWP switching command in the control information, $d_{1,3}$ may be 0.

In another embodiment, Equation 2 may be replaced by following Equation 4 to calculate $T_{proc,2}$ to take into account the BWP switching time.

$$T_{proc,2} = ((N_2 + d_{2,1} + d_{2,2})(2048+144) \cdot \kappa 2^{-\mu}) \cdot T_C \quad \text{Equation 4}$$

Parameters $N_2$, $d_{2,1}$, $\kappa$, $\mu$, and TC in Equation 4 may be defined equally as in Equation 2, and $d_{2,2}$ may be a parameter for taking the BWP switching time into account. For example, when the BWP switching command is delivered in the control information, $d_{2,2}$ may have a value defined to be greater than 0. When there is no BWP switching command in the control information, $d_{2,2}$ may be 0.

In another embodiment, Equation 2 may be replaced by following Equation 5 to calculate $T_{proc,2}$ to take into account the BWP switching time.

$$T_{proc,2} = \max\{((N_2 + d_{2,1} + d_{2,2})(2048+144) \cdot \kappa 2^{-\mu} \cdot T_C, \text{delay}_{BWP\_switching}\} \quad \text{Equation 5}$$

In Equation 5, $N_2$, $d_{2,1}$, $\kappa$, $\mu$, and $T_C$ may be defined equally as in Equation 2. In an embodiment, Equation 5 may be applied when there is the BWP switching command in the control information. Alternatively, the aforementioned procedure may be defined by the following [pseudo-code 1].

In Equation 5, $\text{delay}_{BWP\_switching}$ may be time available for the UE to switch the BWP as defined in Table 4. However, the values presented in Table 4 may be changed for application without being limited thereto.

[Start pseudo-code 1]
If BWP switching is triggered by UL grant, $$T_{proc,2} = \max\{((N_2 + d_{2,1})(2048+144) \cdot \kappa 2^{-\mu}) \cdot T_C, \text{delay}_{BWP\_switching}\}$$

Else $$T_{proc,2} = ((N_2 + d_{2,1})(2048+144) \cdot \kappa 2^{-\mu}) \cdot T_C$$

End.
[End pseudo-code 1]

In the disclosure, max{a,b} may refer to the larger of the values a and b. In the description, $\text{delay}_{BWP\_switching}$ may be time available for the UE to switch the BWP as defined in Table 4. However, the values presented in Table 4 may be changed for application without being limited thereto.

Specifically, a process of calculating $T_{proc,2}$ according to an embodiment may define $T_{proc,2}$ to be a maximum value of data processing and preparation time defined as time required for preparing a PUSCH and time required to switch the BWP.

In another embodiment to take the BWP switching time into account, $T_{proc,2}$ may be calculated first by using Equation 2 and $T_{proc,2}$ may be substituted with $\text{delay}_{BWP\_switching}$ when there is a BWP switching command in DCI for scheduling the PUSCH and $\text{delay}_{BWP\_switching}$ is greater than $T_{proc,2}$ calculated in Equation 2. Alternatively, the aforementioned procedure may be defined by the following [pseudo-code 2].

[Start pseudo-code 2]
$T_{proc,2}$ is calculated with Equation 2,
If BWP switching is triggered by UL grant and $\text{delay}_{BWP\_switching} >$ (or $\geq$) $T_{proc,2}$,
Replace $T_{proc,2}$ as $T_{proc,2} = \text{delay}_{BWP\_switching}$.
End.
[End pseudo-code 2]

In another embodiment, a device may calculate a minimum processing time for determining timing to transmit HARQ-ACK when receiving successively scheduled DL data or PDSCHs. This will now be described with reference to FIGS. 12 to 16.

Figure 12:
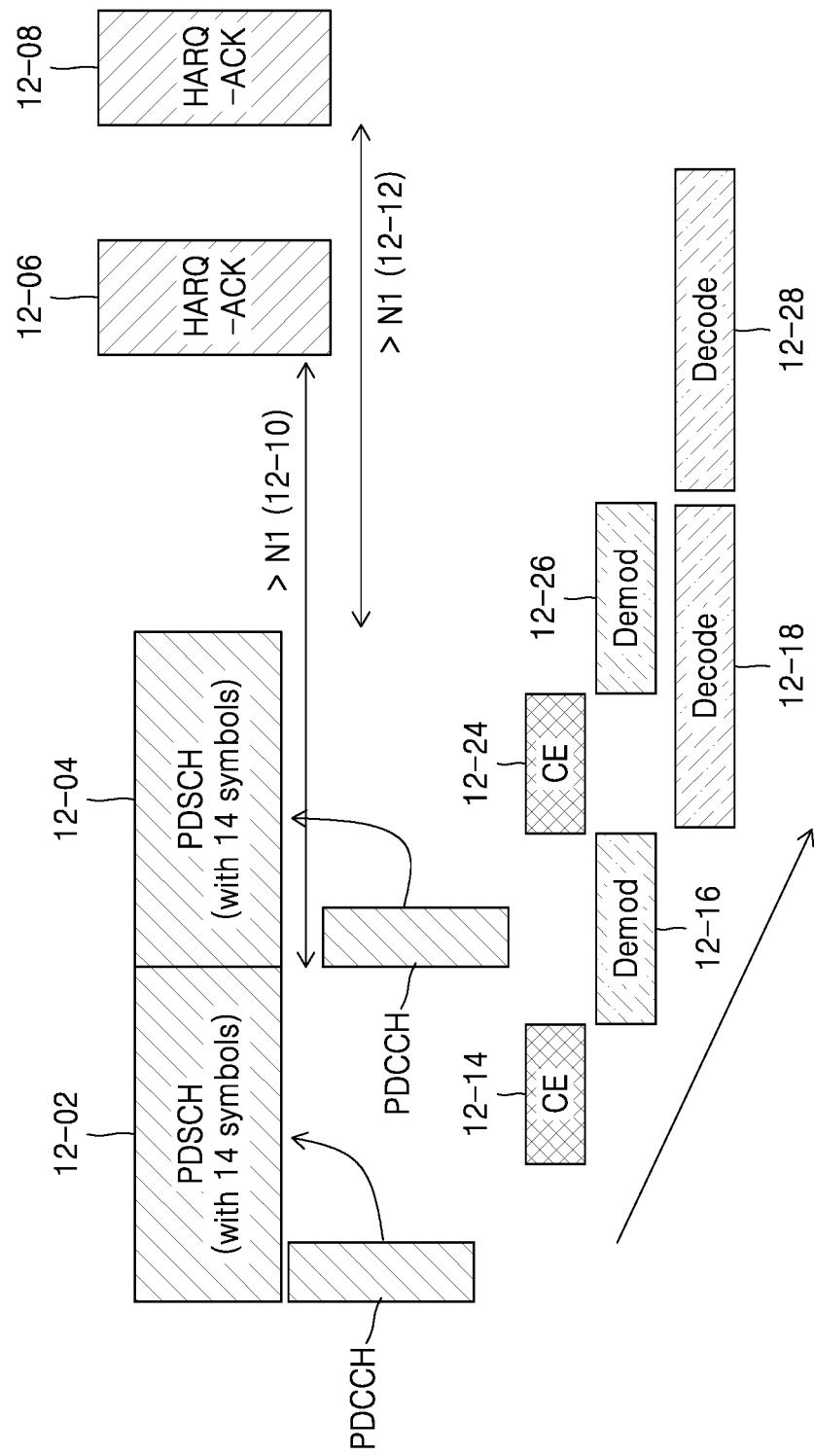
FIG. 12 is a view for describing a processing procedure of a UE when PDSCHs each having 14-symbol length are successively scheduled, according to another embodiment of the disclosure.

FIG. 12 is a view for describing a processing procedure of a UE when PDSCHs each having 14-symbol length are successively scheduled, according to another embodiment of the disclosure.

Referring to FIG. 12, a first PDSCH is received in 12-02. The UE performs channel estimation (hereinafter, CE) in 12-14, and then sequentially performs demodulation (Demod) in 12-16 and decoding (Decode) in 12-18. In an embodiment, such a procedure as HARQ-ACK preparation and UL transmission preparation may be further performed.

When a second PDSCH is received in 12-04, the UE may perform CE in 12-24 to receive the second PDSCH after the CE 12-14 performed when the first PDSCH was received has been completed. Likewise, the UE may sequentially perform demodulation in 12-16 and decoding in 12-28. This may be based on a pipelining structure of the UE processor. The aforementioned processing procedure may be smaller than $T_{proc,1}$ calculated or N1 defined as the minimum processing time. Subsequently, the UE may transmit HARQ-ACK to the BS in 12-06.

Figure 13:
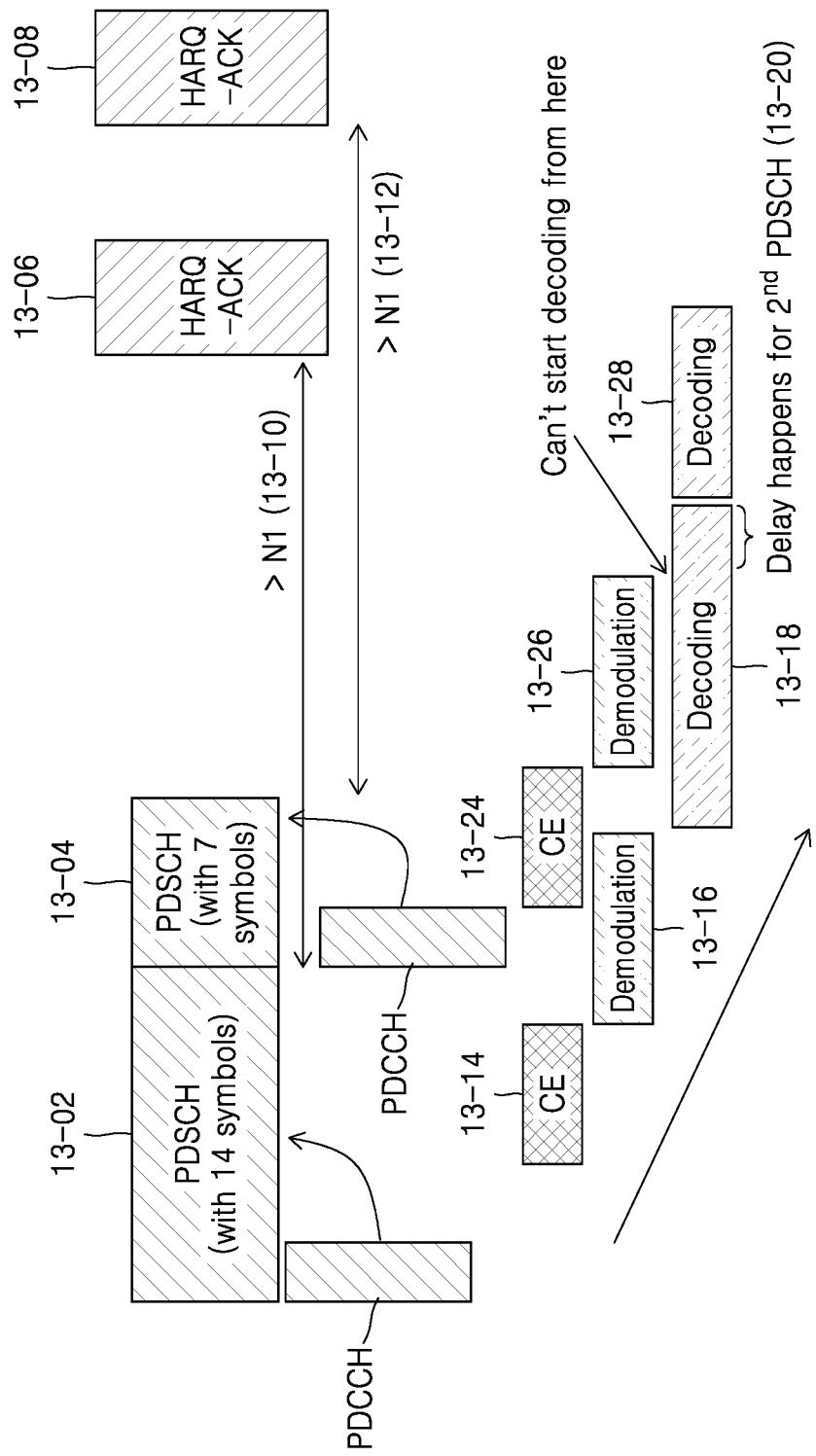
FIG. 13 is a view for describing a processing procedure of a UE when a PDSCH having 14-symbol length is received and a PDSCH having 7-symbol length is received, according to another embodiment.

FIG. 13 is a view for describing a processing procedure of a UE when a PDSCH having 14-symbol length is received and a PDSCH having 7-symbol length is received, according to another embodiment.

Referring to FIG. 13, the UE receives a first PDSCH in 13-02, performs channel estimation (hereinafter, CE) in 13-14, and then sequentially performs demodulation (Demod) in 13-16 and decoding (Decode) in 13-18. In an embodiment, such a procedure as HARQ-ACK preparation and UL transmission preparation may be further performed.

When a second PDSCH is received in 13-04, the UE may perform CE in 13-24 to receive the second PDSCH after the CE 13-14 performed when the first PDSCH was received has been completed. Likewise, the UE may sequentially perform demodulation in 13-16 and decoding in 13-28. In this case, decoding in 13-28 needs to be performed after completion of demodulation of the second PDSCH in 13-26, but when the decoding of the first PDSCH in 13-18 has not yet been completed, decoding of the second PDSCH in 13-28 may not begin. This is because there may be only one block capable of decoding in the processing structure of the particular UE. In this case, processing time for the second PDSCH may increase in 13-20.

Figure 14:
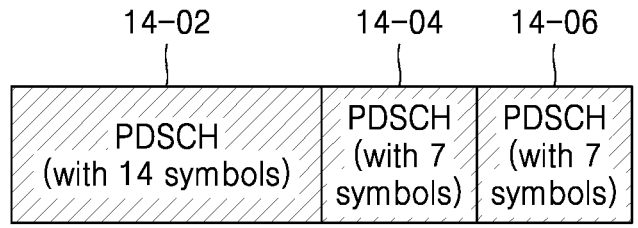
FIG. 14 is a view for describing a method by which three PDSCHs are successively scheduled, according to another embodiment of the disclosure.

FIG. 14 is a view for describing a method by which three PDSCHs are successively scheduled, according to another embodiment of the disclosure.

Referring to FIG. 14, a first PDSCH 14-02 has a length of 14 symbols, and second and third PDSCHs 14-04 and 14-06 each has a length of 7 symbols. Even in this case, as described above with reference to FIG. 13, when a minimum processing time for the second and third PDSCHs is calculated, an additional delay caused by processing of the first PDSCH 14-02 may be taken into account.

As described above, to reflect the additional delay caused by processing of the previously scheduled PDSCH in the minimum processing time, a counter for the additional delay d may be introduced. The counter may be a processing time counter or an additional delay counter.

Figure 15:
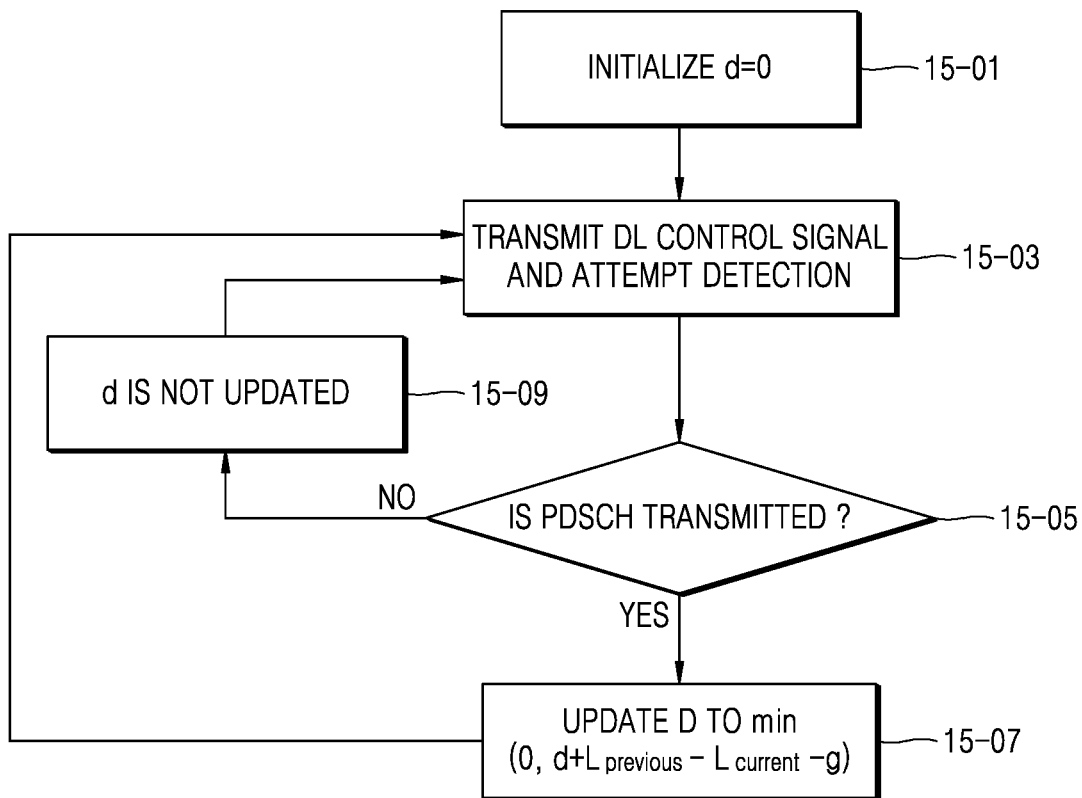
FIG. 15 is a view for describing operations of a UE and a BS for updating a counter for an additional delay, according to another embodiment of the disclosure.

FIG. 15 is a view for describing operations of a UE and a BS for updating a counter for an additional delay, according to another embodiment of the disclosure.

Referring to FIG. 15, in operation 15-01, a BS and a UE initialize d to 0. In operation 15-03, the BS transmits control information for PDSCH scheduling and the UE attempts detection. When no PDSCH is transmitted, d is not updated in operation 15-09. When a PDSCH is transmitted, d is updated as in following Equation 6 in operation 15-07.

$$d \leftarrow \min(0, d + L_{previous} - L_{current} - g) \quad \text{Equation 6}$$

In Equation 6, min(x,y) refers to the smaller of x and y, $L_{previous}$ refers to the number of OFDM symbols in which the previously received PDSCH is transmitted, $L_{current}$ refers to the number of OFDM symbols in which the currently received PDSCH is transmitted, and g refers to a value that expresses a time gap or a gap from the end of the previously received PDSCH to the beginning of the currently received PDSCH in the number of OFDM symbols.

Figure 16:
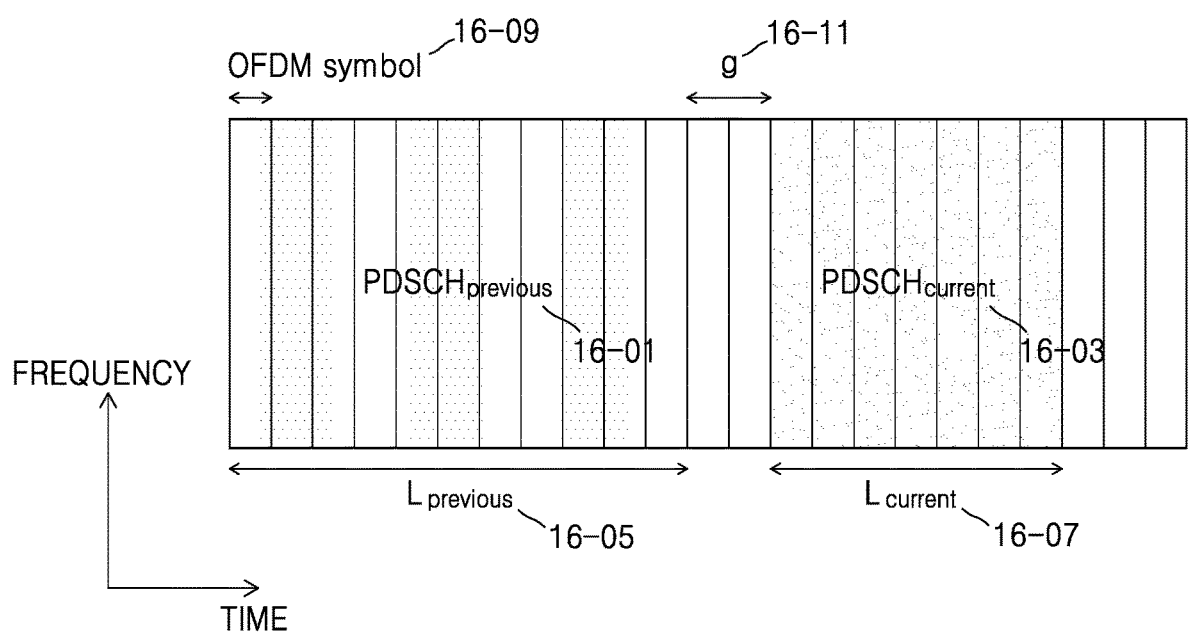
FIG. 16 is a view for describing Equation 5, according to another embodiment of the disclosure.

FIG. 16 is a diagram for describing Equation 6.

Referring to FIG. 16, when $PDSCH_{previous}$ 16-01, which is a previously received PDSCH, and $PDSCH_{current}$ 16-03, which is a currently received PDSCH, are transmitted, the respective lengths of the PDSCHs are $L_{previous}$ 16-05 and $L_{current}$ 16-07. And g 16-11 is a gap between the two PDSCHs. It may aim at securing enough processing time of $PDSCH_{current}$, which is the second PDSCH. Equation 6 may be modified to following Equation 7 to be performed.

$$d \leftarrow \min(0, d + L_{previous} - L_{current} - g) \quad \text{Equation 7}$$

In Equation 7, δ may be a predefined constant to minimize the processing time. In another embodiment, δ may be a value that varies according to subcarrier spacing.

In another embodiment, a method and apparatus for delivering information about a time domain resource in which a PDSCH including DL data or a PUSCH including UL data is transmitted may be provided.

Information of a slot to which the PDSCH is mapped may be delivered as a value of $K_0$ from the BS to the UE by combining of DCI and higher signaling. The BS and the UE may determine a slot, to which the PDSCH is mapped or which is allocated for the PDSCH, to be $n+K_0$ based on the value of $K_0$. The n may be an index value of the latest or the last of slots overlapping in the time domain with the last OFDM symbol to which a PDCCH including DCI for scheduling the PDSCH is mapped.

In this case, the slot overlapping in the time domain with the OFDM symbol in which the PDCCH is transmitted may mean that at least one or more of OFDM symbols in which the PDCCH is transmitted and part or all of a particular slot are both received by the UE at the same time in the time domain.

The values of n and $K_0$ may refer to slot values in a frame structure based on a subcarrier of the PDSCH. This may be described as below. The n may be applied by being modified to an index value of the latest or the last of slots overlapping in the time domain with one or more OFDM symbols to which the PDCCH including DCI for scheduling the PDSCH is mapped.

The slot allocated for the PDSCH is $n+K_0$, where n is the latest slot among the slots overlapped with the last symbol of the PDCCH carrying the scheduling DCI, and where n and $K_0$ are based on the numerology of PDSCH.

Or it may be applied as follows.

The slot allocated for the PDSCH is $n+K_0$, where n is the latest slot among the slots overlapped with the symbol(s) of the PDCCH carrying the scheduling DCI, and where n and $K_0$ are based on the numerology of PDSCH.

Information of a slot to which the PUSCH is mapped may be delivered as a value of $K_2$ from the BS to the UE by combining of DCI and higher signaling. The BS and the UE may determine a slot, to which the PUSCH is mapped or which is allocated for the PUSCH, to be $n+K_2$ based on the value of $K_2$. The n may be an index value of the latest or the last of slots overlapping in the time domain with the last OFDM symbol to which a PDCCH including DCI for scheduling the PUSCH is mapped. The values of n and $K_2$ may refer to slot values in a frame structure based on a subcarrier of the PUSCH. This may be described as below. The n may be applied by being modified to an index value of the latest or the last of slots overlapping in the time domain with one or more OFDM symbols to which the PDCCH including DCI for scheduling the PUSCH is mapped.

The slot where the UE shall transmit the PUSCH is determined by $K_2$ as $n+K_2$, where n is the latest slot among the slots overlapped with the last symbol of the PDCCH carrying the scheduling DCI, and where n and $K_2$ are based on the numerology of PUSCH.

Or it may be applied as follows.

The slot where the UE shall transmit the PUSCH is determined by $K_2$ as $n+K_2$, where n is the latest slot among the slots overlapped with the symbol(s) of the PDCCH carrying the scheduling DCI, and where n and $K_2$ are based on the numerology of PUSCH.

In another embodiment of the disclosure, the UE may provide a method and apparatus for determining whether to transmit a PDSCH including DL data.

Information of a slot to which the PDSCH is mapped may be delivered as a value of $K_0$ from the BS to the UE by combining of DCI and higher signaling. When the slot to which the PDSCH received by the UE is mapped is transmitted earlier than the DCI for scheduling the PDSCH, the UE may not perform decoding of the PDSCH. Subsequently, the UE may consider HARQ-ACK information corresponding to the PDSCH as NACK and transmit it to the BS.

Figure 17:
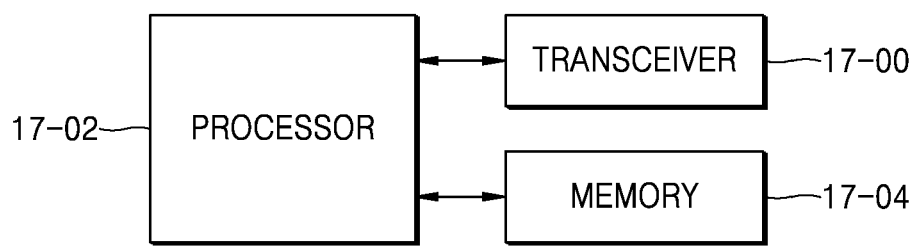
FIG. 17 is a block diagram of an internal structure of a UE, according to an embodiment of the disclosure.

FIG. 17 is a block diagram of an internal structure of a UE, according to an embodiment of the disclosure.

Referring to FIG. 17, a UE may include a transceiver 17-00, a memory 17-04, and a processor 17-02. The transceiver 17-00, the memory 17-04, and the processor 17-02 of the UE may operate according to the aforementioned communication method of the UE. Components of the UE are not, however, limited thereto. For example, the UE may include more or fewer elements than described above. In addition, the transceiver 17-00, the memory 17-04, and the processor 17-02 may be implemented in a single chip.

The transceiver 17-00 may transmit or receive signals to or from a BS. The signals may include control information and data. For this, the transceiver 17-00 may include an RF transmitter for up-converting the frequency of a signal to be transmitted and amplifying the signal and an RF receiver for low-noise amplifying a received signal and down-converting the frequency of the received signal. It is merely an example of the transceiver 17-00, and the elements of the transceiver 17-00 are not limited to the RF transmitter and RF receiver.

In addition, the transceiver 17-00 may receive a signal on a wireless channel and output the signal to the processor 17-02, or transmit a signal output from the processor 17-02 on a wireless channel.

The memory 17-04 may store a program and data required for operation of the UE. Furthermore, the memory 17-04 may store control information or data included in a signal obtained by the UE. The memory 17-04 may include a storage medium such as a ROM, a RAM, a hard disk, a CD-ROM, and a DVD, or a combination of storage mediums. Moreover, the memory 17-04 may be in the plural. In an embodiment, the memory 17-04 may store a program to support beam based cooperative communication.

The processor 17-02 may control a series of processes for the UE to be operated according to the embodiments of the disclosure. For example, when the transceiver 17-00 receives control information including scheduling information from the BS, the processor 17-02 may determine a minimum processing time based on whether to switch a BWP and perform signal processing accordingly. Subsequently, UL transmission corresponding to the control information may be performed by the transceiver 17-00.

Figure 18:
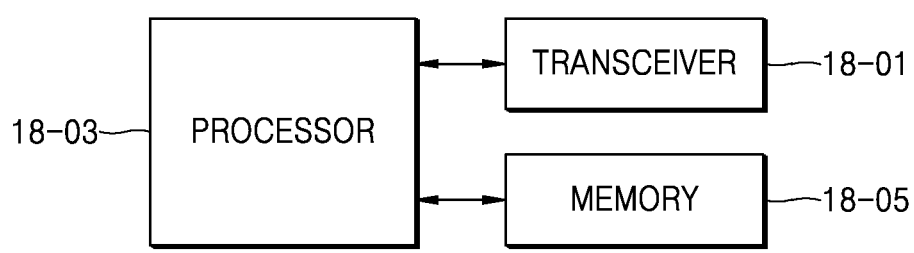
FIG. 18 is a block diagram of an internal structure of a BS, according to an embodiment of the disclosure.

FIG. 18 is a block diagram of an internal structure of a BS, according to an embodiment of the disclosure.

Referring to FIG. 18, a BS may include a transceiver 18-01, a memory 18-05, and a processor 18-03. The transceiver 18-01, the memory 18-05, and the processor 18-03 of the BS may operate according to the aforementioned communication method of the BS. Components of the BS are not, however, limited thereto. For example, the BS may include more or fewer elements than described above. In addition, the transceiver 18-01, the memory 18-05, and the processor 18-03 may be implemented in a single chip.

The transceiver 18-01 may transmit or receive signals to or from a UE. The signals may include control information and data. For this, the transceiver 18-01 may include an RF transmitter for up-converting the frequency of a signal to be transmitted and amplifying the signal and an RF receiver for low-noise amplifying a received signal and down-converting the frequency of the received signal. It is merely an example of the transceiver 18-01, and the elements of the transceiver 18-01 are not limited to the RF transmitter and RF receiver.

In addition, the transceiver 18-01 may receive a signal on a wireless channel and output the signal to the processor 18-03, or transmit a signal output from the processor 18-03 on a wireless channel.

The memory 18-05 may store a program and data required for operation of the BS. Furthermore, the memory 18-05 may store control information or data included in a signal obtained by the BS. The memory 18-05 may include a storage medium such as a ROM, a RAM, a hard disk, a CD-ROM, and a DVD, or a combination of storage mediums. Moreover, the memory 18-05 may be in the plural. In an embodiment, the memory 18-05 may store a program to support beam based cooperative communication.

The processor 18-03 may control a series of processes for the BS to be operated according to the aforementioned embodiments. For example, the processor 18-03 may determine a minimum processing time according to whether to switch a BWP and control to determine timing to transmit a second signal. Subsequently, the transceiver 18-01 may transmit control information involving the timing information determined in the above embodiment, and receive the second signal from the UE at the timing.

Methods according to the claims of the disclosure or the embodiments described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a LAN, a wide LAN (WLAN), or a storage area network (SAN), or a combination thereof. The storage device may be connected to an apparatus performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments of the disclosure may be operated by being combined with one another if necessary. For example, an embodiment of the disclosure and some of another embodiment may be combined to operate the base station and the terminal. The embodiments may be equally applied to other communication systems, and other modifications of the embodiments may also be made without departing from the scope of the disclosure.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes.

Furthermore, the embodiments of the disclosure may be operated by being combined with one another if necessary. For example, an embodiment of the disclosure and some of another embodiment may be combined together. Furthermore, the embodiments of the disclosure may also be applied to e.g., an LTE, 5G or NR system, etc.

The invention claimed is:

1. A method performed by a terminal of transmitting and receiving signals in a wireless communication system, the method comprising:
   receiving, from a base station, control information including an uplink grant;
   in case that a bandwidth part (BWP) switching is triggered by the control information, identifying a larger value between a first time and a BWP switching time as a processing time for preparing a physical uplink shared channel (PUSCH), wherein the first time is a time for transmitting the PUSCH identified based on the uplink grant; and
   transmitting, to the base station, the PUSCH based on the processing time.

2. The method of claim 1, wherein the identifying the larger value between the first time and the BWP switching time as the processing time comprises:
   identifying the processing time based on a first equation, wherein the first equation is $T_{proc,2} = \max(((N_2+d_{2,1})(2048+144) \cdot \kappa 2^{-\mu} \cdot T_c, d_{BWP\_switching})$, where $T_{proc,2}$ refers to the processing time, $((N_2+d_{2,1})(2048+144) \cdot \kappa 2^{-\mu} \cdot T_c$ refers to the first time, $N_2$ refers to preparation time for the PUSCH, $d_{2,1}$ refers to whether a first symbol from among symbols allocated for the PUSCH only includes a demodulation reference signal (DMRS), $\kappa$ refers to 64, $\mu$ refers to subcarrier spacing, $T_c$ refers to $1/(\Delta f_{max} \cdot N_f)$, $\Delta f_{max}$ refers to $480 \cdot 10^3$ Hz, and $N_f$ refers to 4096, $d_{BWP\_switching}$ refers to the BWP switching time.

3. The method of claim 2, wherein $d_{BWP\_switching}$ is zero in case that the BWP switching is not triggered based on the control information.

4. The method of claim 1, wherein the transmitting, to the base station, the PUSCH based on the processing time comprises:
   ignoring the uplink grant in case that a timing to transmit the PUSCH identified based on the uplink grant is earlier than a timing identified based on the processing time.

5. The method of claim 1, wherein the BWP switching time is identified based on UE capability.

6. A terminal for transmitting and receiving signals in a wireless communication system, the terminal comprising:
   a transceiver; and
   at least one processor configured to:
      receive via the transceiver, from a base station, control information including an uplink grant,
      in case that a bandwidth part (BWP) switching is triggered by the control information, identify a larger value between a first time and a BWP switching time as a processing time, wherein the first time is a time for transmitting a physical uplink shared channel (PUSCH) identified based on the uplink grant, and
      transmit via the transceiver, to the base station, the PUSCH based on the processing time.

7. The terminal of claim 6,
   wherein the at least one processor is further configured to identify the processing time based on a first equation, and
   wherein the first equation is $T_{proc,2} = \max(((N_2+d_{2,1})(2048+144) \cdot \kappa 2^{-\mu} \cdot T_c, d_{BWP\_switching})$, where $T_{proc,2}$ refers to the processing time, $((N_2+d_{2,1})(2048+144) \cdot \kappa 2^{-\mu} \cdot T_c$ refers to the first time, $N_2$ refers to preparation time for the PUSCH, $d_{2,1}$ refers to whether a first symbol from among symbols allocated for the PUSCH only includes a demodulation reference signal (DMRS), $\kappa$ refers to 64, $\mu$ refers to subcarrier spacing, $T_c$ refers to $1/(\Delta f_{max} \cdot N_f)$, $\Delta f_{max}$ refers to $480 \cdot 10^3$ Hz, and $N_f$ refers to 4096, $d_{BWP\_switching}$ refers to the BWP switching time.

8. The terminal of claim 7, wherein $d_{BWP\_switching}$ is zero in case that the BWP switching is not triggered based on the control information.

9. The terminal of claim 6, wherein the at least one processor is further configured to ignore the uplink grant in case that a timing to transmit the PUSCH identified based on the uplink grant is earlier than a timing identified based on the processing time.

10. The terminal of claim 6, wherein the BWP switching time is identified based on UE capability.

* * * * *